(12) United States Patent
Iida et al.

(10) Patent No.: US 10,848,639 B2
(45) Date of Patent: Nov. 24, 2020

(54) IMAGE FORMING APPARATUS, IMAGE FORMING SYSTEM, AND ERROR NOTIFICATION METHOD

(71) Applicant: CANON KABUSHIKI KAISHA, Tokyo (JP)

(72) Inventors: Toshihiko Iida, Toride (JP); Hiroya Igarashi, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/415,508

(22) Filed: May 17, 2019

(65) Prior Publication Data
US 2019/0364169 A1 Nov. 28, 2019

(30) Foreign Application Priority Data

May 22, 2018 (JP) .................................. 2018-098059

(51) Int. Cl.
| G06F 15/00 | (2006.01) |
| G06F 3/12 | (2006.01) |
| G06K 1/00 | (2006.01) |
| H04N 1/32 | (2006.01) |
| H04N 1/00 | (2006.01) |

(52) U.S. Cl.
CPC ......... *H04N 1/32662* (2013.01); *G06F 3/121* (2013.01); *G06F 3/1234* (2013.01); *G06F 3/1286* (2013.01); *H04N 1/00281* (2013.01); *H04N 1/00477* (2013.01); *H04N 1/32625* (2013.01); *H04N 2201/0039* (2013.01); *H04N 2201/0072* (2013.01); *H04N 2201/0094* (2013.01)

(58) Field of Classification Search
CPC ........... H04N 1/32662; H04N 1/00281; H04N 1/00477; H04N 1/32625; H04N 2201/0039; H04N 2201/0072; H04N 2201/0094; G06F 3/121; G06F 3/1234; G06F 3/1286
USPC .............................. 358/1.14, 1.15, 1.13, 1.1
See application file for complete search history.

(56) References Cited

U.S. PATENT DOCUMENTS

| 2010/0070794 A1* | 3/2010 | Park .................... G06F 11/0733 714/2 |
| 2015/0278564 A1* | 10/2015 | Naruse .................. G06F 3/1292 340/10.51 |
| 2016/0150104 A1* | 5/2016 | Wagatsuma .......... G06F 3/1294 358/1.15 |

(Continued)

FOREIGN PATENT DOCUMENTS

JP 2014-123165 A 7/2014

*Primary Examiner* — Douglas Q Tran
(74) *Attorney, Agent, or Firm* — Venable LLP

(57) ABSTRACT

An image forming apparatus, to which terminals are connected, comprises an image forming unit, a detector that detects an error, and a controller that, when the error is detected, specifies a portable terminal through which an operation to eliminate the error is requested, transmits a request to the specified terminal, and transmits a notification that notifies of an occurrence of the error to each terminal other than the specified terminal. The terminal that has received the request displays information representing an error type and information promoting an elimination of the error, and the terminal that has received the notification displays not the information that promotes the elimination of the error, but the information representing the error type.

20 Claims, 26 Drawing Sheets

(56) References Cited

U.S. PATENT DOCUMENTS

2016/0224279 A1* 8/2016 Kim ...................... H04L 67/10

* cited by examiner

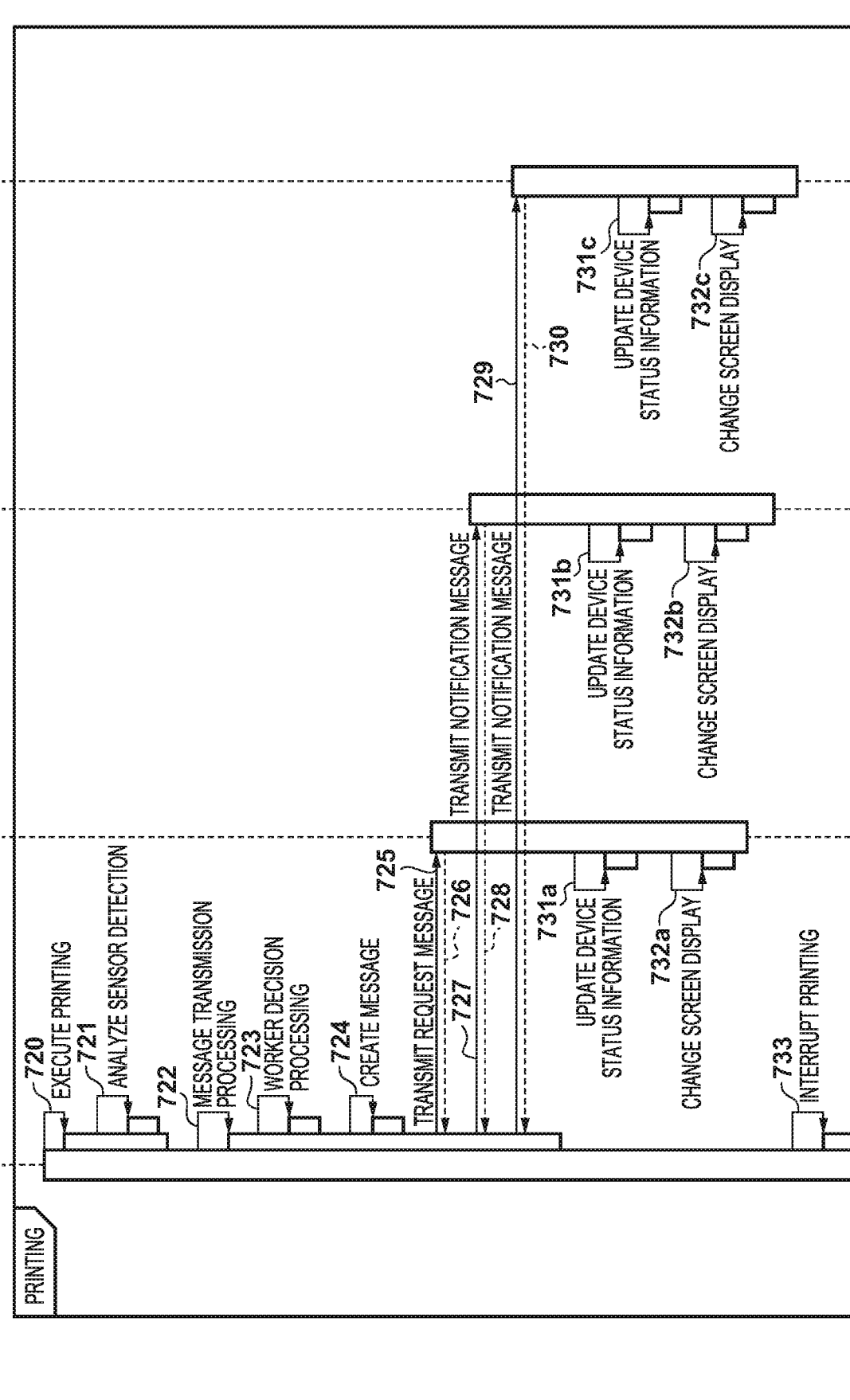

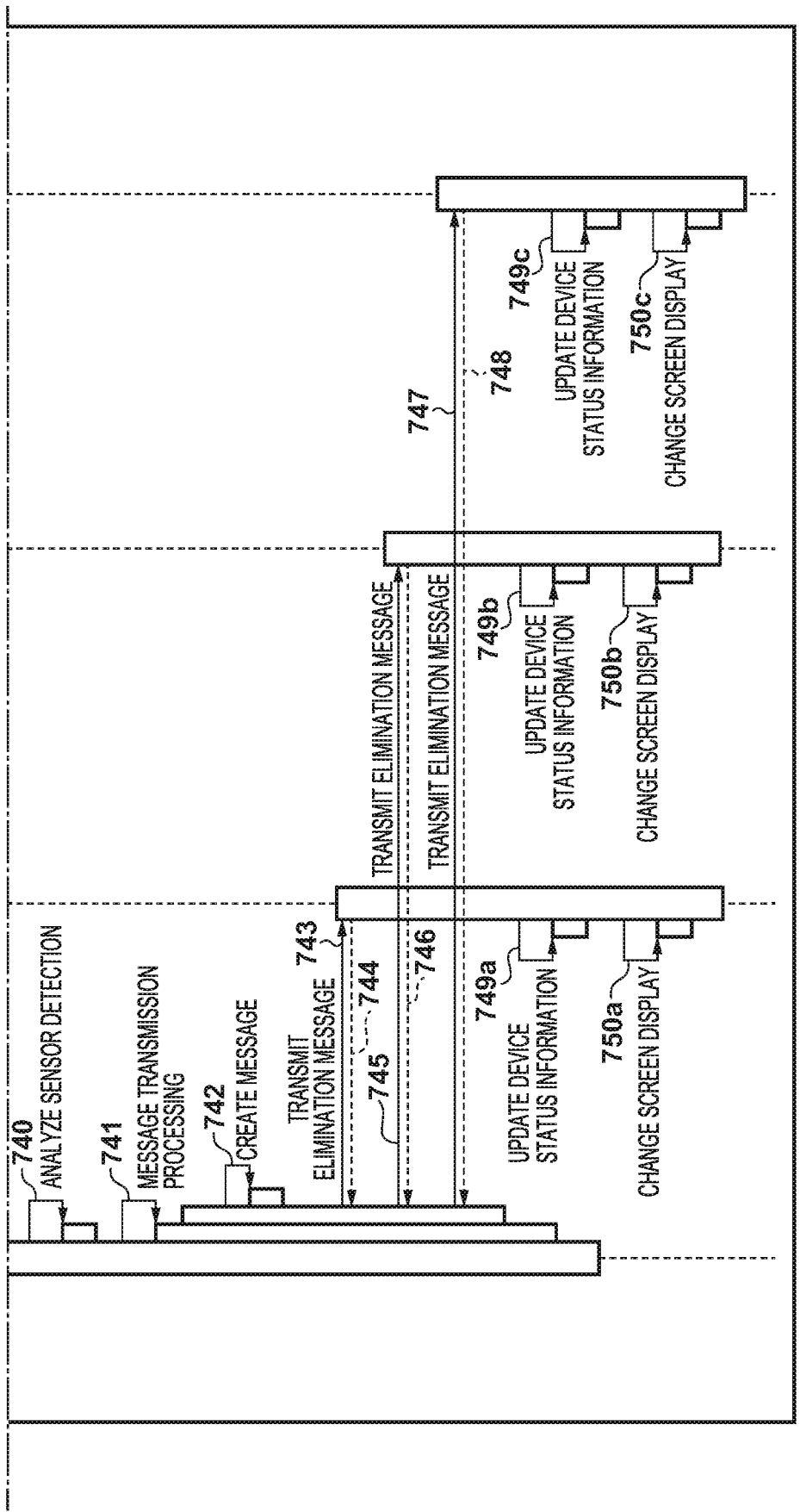

FIG. 8A 800

| 1 | ABC12345 | 2 | Not Assigned |
|---|---|---|---|
| 3 | Not Assigned | 4 | Not Assigned |

| 2 | Paring Device |
|---|---|
|   | ABC12345 |
|   | JEW38123 |
|   | OKD82942 |

| 2 | Error Type |
|---|---|
|   | NO PAPER |
|   | JAM |
|   | NO TONER |
|   | TRAY FULL |
|   | SERVICE CALL |

| 2 | Paring Device |
|---|---|

Device: JEW38123  — 831
Error Type: NO PAPER  — 832
JAM
TRAY FULL

[OK] 833    [Cancel] 834

FIG. 8E 840

| 1 | ABC12345 | 2 | JEW38123 |
|---|---|---|---|
| 3 | Not Assigned | 4 | Not Assigned |

| 1 | Device Status |
|---|---|
|   | NO PAPER |
|   | JAM |
|   | NO TONER |
|   | TRAY FULL |
|   | SERVICE CALL |

| Status |
|---|
| Available    Busy |

| 1 | ABC12345 | 2 | JEW38123 |
|---|---|---|---|
| 3 | Not Assigned | 4 | Not Assigned |

| 2 | Device Status |
|---|---|
|   | NO PAPER |
|   | JAM |
|   | NO TONER |
|   | TRAY FULL |
|   | SERVICE CALL |

| 2 | JAM |
|---|---|

Action Request — 891
JEW38123
The device is requiring your action to resume printing.

FIG. 9

| | IDENTIFICATION INFORMATION | COMMUNICATION INFORMATION | REQUEST PRIORITY ASSIGNMENT ERROR TYPE | OPERATOR STATUS |
|---|---|---|---|---|
| | 911 | 912 | 913 | 914 |
| 901a | SIE29547 | 172.23.194.101 | NO PAPER, NO TONER | Available |
| 901b | EUT18245 | 172.23.194.102 | JAM, TRAY FULL, SERVICE CALL | Available |
| 901c | UED83465 | 172.23.194.103 | JAM, TRAY FULL, SERVICE CALL | Busy |

| | IDENTIFICATION INFORMATION | COMMUNICATION INFORMATION | DISPLAY REGION | REQUEST SITUATION | NOTIFICATION SITUATION |
|---|---|---|---|---|---|
| | 1011 | 1012 | 1013 | 1014 | 1015 |
| 1001a | ABC12345 | 172.23.194.111 | 1 | | JAM |
| 1001b | JEW38123 | 172.23.194.112 | 2 | JAM | |
| 1001c | OKD82942 | 172.23.194.113 | 3 | | JAM |

1000

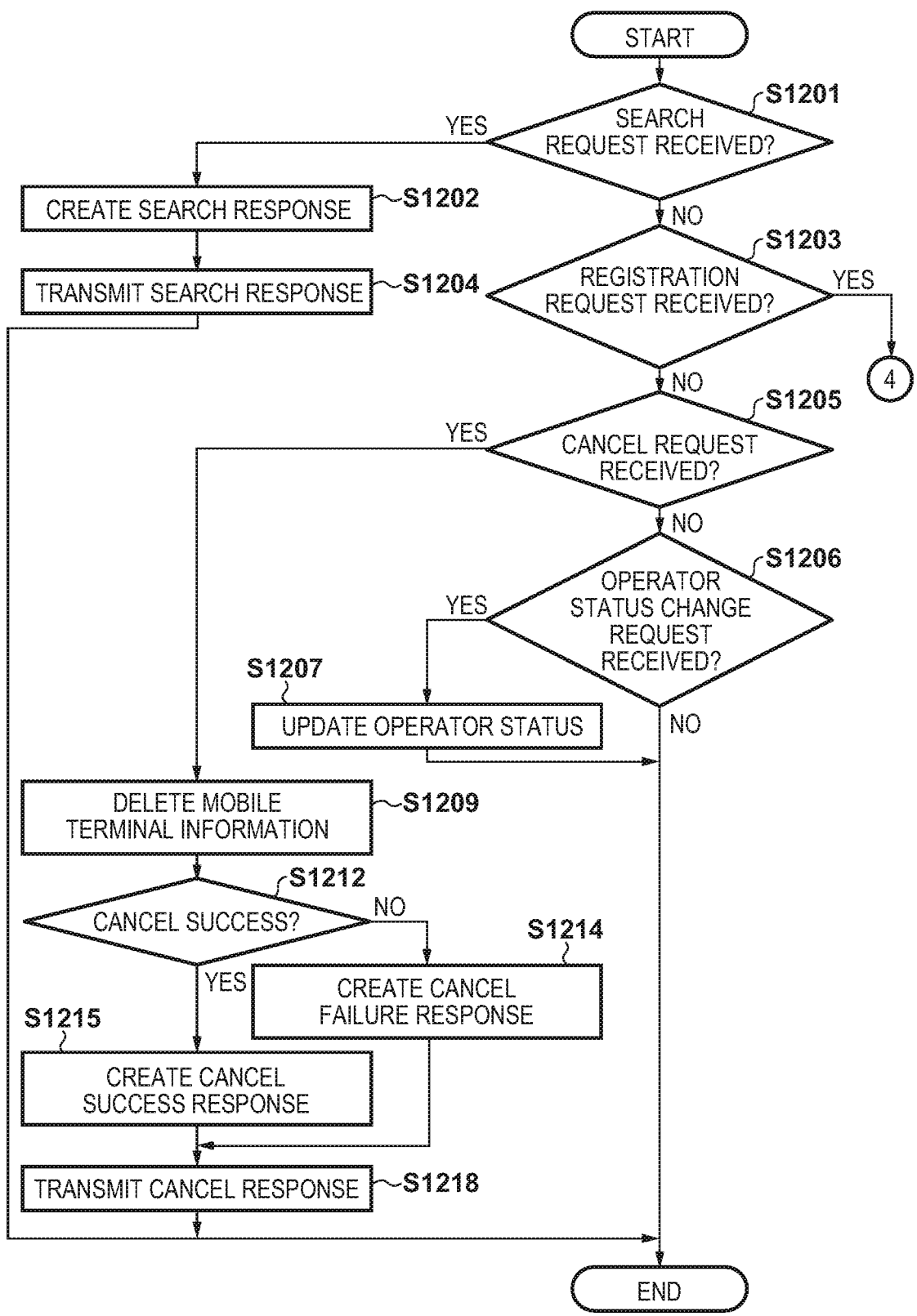

F I G. 15
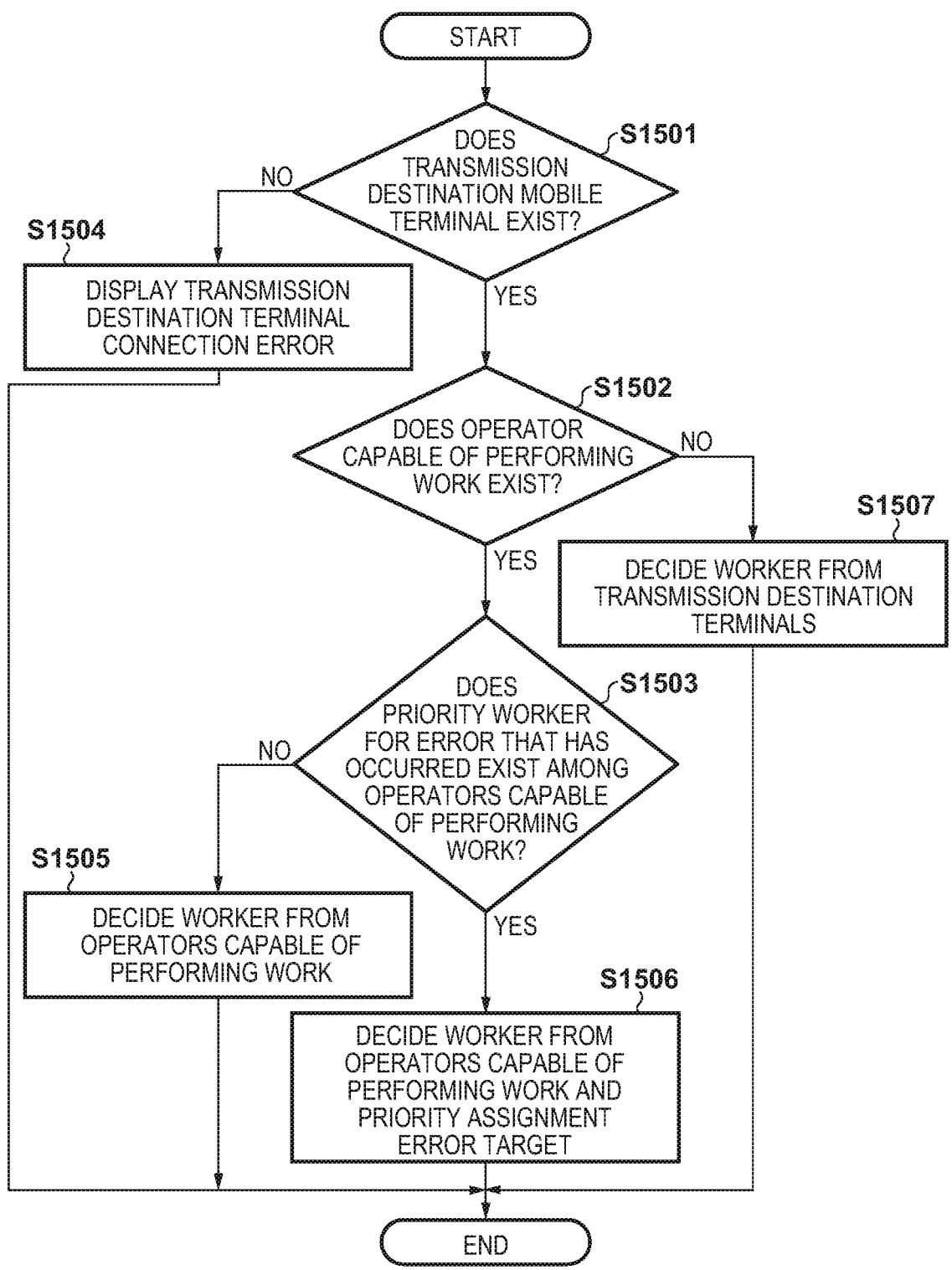

FIG. 16A

| ATTRIBUTE NAME | ATTRIBUTE VALUE |
|---|---|
| IDENTIFICATION INFORMATION | JEW38123 |
| MESSAGE TYPE | Request |
| ERROR TYPE | JAM |

FIG. 16B

| ATTRIBUTE NAME | ATTRIBUTE VALUE |
|---|---|
| IDENTIFICATION INFORMATION | JEW38123 |
| MESSAGE TYPE | Notification |
| ERROR TYPE | JAM |

FIG. 16C

| ATTRIBUTE NAME | ATTRIBUTE VALUE |
|---|---|
| IDENTIFICATION INFORMATION | JEW38123 |
| MESSAGE TYPE | StartUp |

FIG. 16D

| ATTRIBUTE NAME | ATTRIBUTE VALUE |
|---|---|
| IDENTIFICATION INFORMATION | JEW38123 |
| MESSAGE TYPE | Clear |
| ERROR TYPE | JAM |

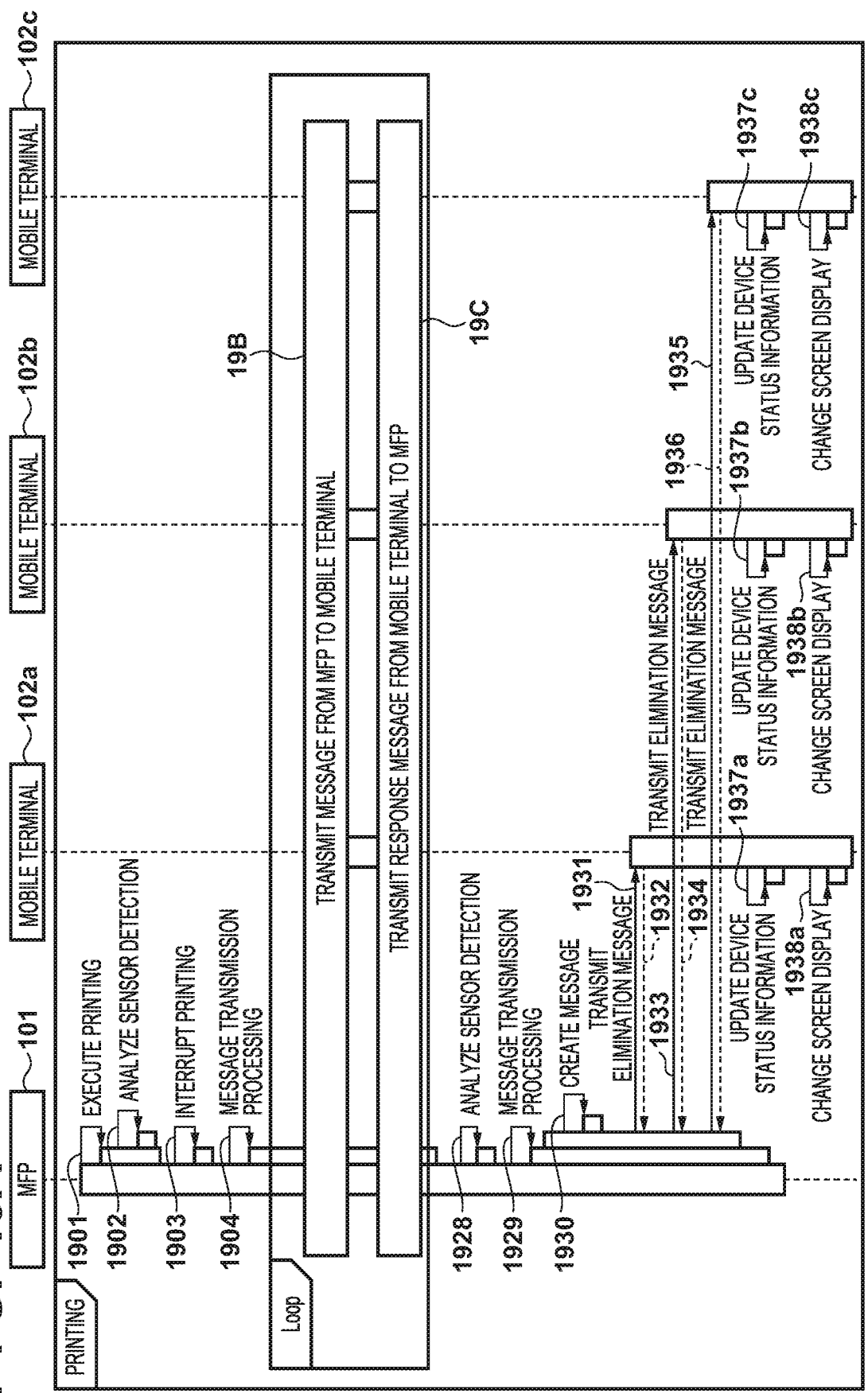

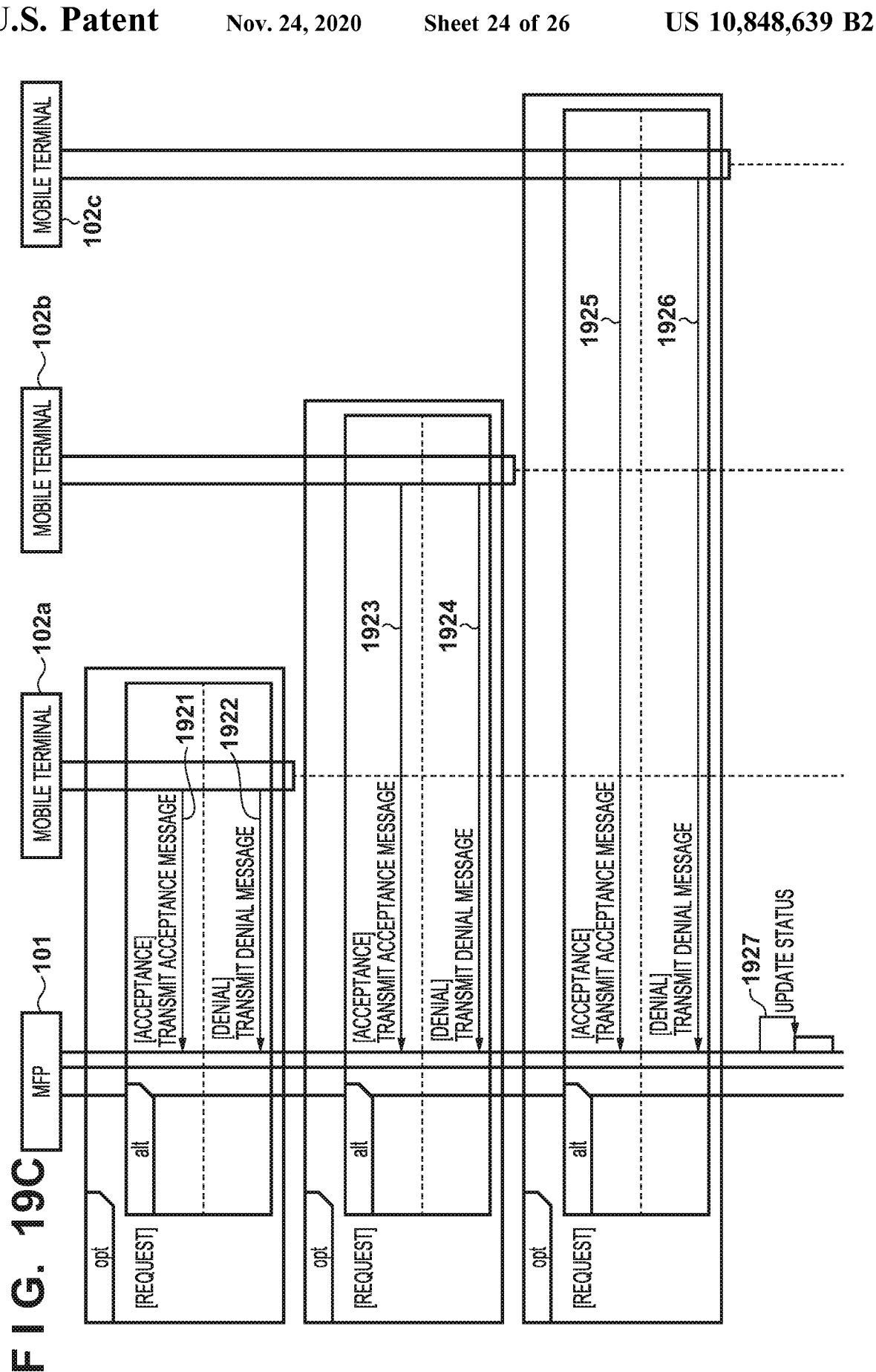

| ATTRIBUTE NAME | ATTRIBUTE VALUE |
|---|---|
| 2101 IDENTIFICATION INFORMATION | SIE29547 |
| 2102 MESSAGE TYPE | Accept |
| 2103 ERROR TYPE | JAM |

IMAGE FORMING APPARATUS, IMAGE FORMING SYSTEM, AND ERROR NOTIFICATION METHOD

BACKGROUND OF THE INVENTION

Field of the Invention

The present invention relates to an image forming apparatus that notifies an error or the like, which occurs in, for example, a printing apparatus and becomes a cause of an interrupt of printing, an image forming system, and an error notification method.

Description of the Related Art

In a printing operation of creating a product using an image forming apparatus, a plurality of steps exist until the product is obtained. Examples are manuscript submission of a print product, editing of print data, preparation of consumables necessary for printing, a print step, a post-processing step for a product after printing, inspection, and shipment. A wide operation space is necessary for these operations. In addition, to prevent degradation and prevent confusion, the operations are generally performed in different rooms or spaces. When a plurality of operators perform the steps in parallel, the printing operation can be performed efficiently. However, to implement such efficient parallel operations of operators, the image forming apparatus used in the printing step needs to prevent an error as a cause of an interrupt of printing from being overlooked or neglected and also needs to prevent a plurality of operators from simultaneously setting about a recovery operation.

For example, in Japanese Patent Laid-Open No. 2014-123165, the position of a communication terminal held by each operator is specified, and in accordance with the type of an error, an operator located at a predetermined position is notified of the occurrence of the error. Only an optimum operator estimated from the position is notified of the error, thereby preventing the error from being neglected and also preventing a plurality of operators from simultaneously interrupting operations in other steps to take an action for the error.

On the other hand, when only the specific operator is notified of the error, the remaining operators cannot know the operation status of the printing apparatus, and it may be impossible to take an optimum action for an error. For example, in a situation in which the operator who has received the notification is busy in the operation he/she is engaged in at that time, elimination of the error delays. In addition, when a notification is not received at the time of an error occurrence, it is impossible to confirm the whole situation and know whether the apparatus continues operating without any error or whether another operator is taking an action for the error. This makes the operators isolated and causes mental uneasiness.

SUMMARY OF THE INVENTION

The present invention provides an image forming apparatus capable of reliably and efficiently performing recovery processing in a case in which an error that interrupts image formation occurs, a status notification system, and a program. The present invention also provides an image forming apparatus capable of tracking an operation situation, an image forming system, and an error notification method.

According to an aspect of the present invention, there is provided an image forming system in which an image forming apparatus and a plurality of portable terminals are connected via wireless communication, wherein the image forming apparatus comprises: an image forming unit configured to form an image on a sheet; a detection unit configured to detect an error as a cause of an interrupt of image formation by the image forming unit; and a transmission control unit configured to, when the error is detected by the detection unit, specify a portable terminal, to which a work to eliminate the error is requested, among the plurality of portable terminals, transmit a request message to the specified portable terminal, and transmit a notification message that notifies an occurrence of the error to each portable terminal other than the specified portable terminal in the plurality of portable terminals, each of the plurality of portable terminals comprises a user interface unit, the portable terminal that has received the request message displays, on the user interface unit, information representing a type of the error and information that promotes an elimination of the error, and the portable terminal that has received the notification message displays, on the user interface unit, not the information that promotes the elimination of the error but the information representing the type of the error.

According to another aspect of the present invention, there is provided an image forming apparatus connected to a plurality of portable terminals via wireless communication, comprising: an image forming unit configured to form an image on a sheet; a detection unit configured to detect an error as a cause of an interrupt of image formation by the image forming unit; and a transmission control unit configured to, when the error is detected by the detection unit, specify a portable terminal, to which a work to eliminate the error is requested, among the plurality of portable terminals, transmit a request message to the specified portable terminal, and transmit a notification message that notifies an occurrence of the error to each portable terminal other than the specified portable terminal in the plurality of portable terminals.

According to the present invention, in a case in which an error that interrupts image formation occurs, it is possible to reliably and efficiently perform recovery processing. In addition, an operator can track the operation situation.

Further features of the present invention will become apparent from the following description of exemplary embodiments with reference to the attached drawings.

BRIEF DESCRIPTION OF THE DRAWINGS

FIG. 7B is a sequence chart of the MFP 101 and the mobile terminals 102 according to the embodiment of the present invention at the time of printing;

FIG. 7C is a sequence chart of the MFP 101 and the mobile terminals 102 according to the embodiment of the present invention at the time of printing (continued);

FIGS. 8A to 8J are schematic views of screens displayed on an operation/display unit 603;

FIG. 9 is an explanatory view of management information of the mobile terminal stored in a RAM 211 and an HDD 212;

FIG. 10 is an explanatory view of device status information stored in a RAM 605 and a nonvolatile memory 606;

FIGS. 12A and 12B show a flowchart of a control unit 201 at the time of communication reception from the mobile terminal 102;

FIG. 15 is a flowchart of the control unit 201 in worker decision processing;

FIGS. 16A to 16D are explanatory views of messages transmitted by the MFP 101;

FIG. 19A is a sequence chart of the second embodiment;
FIG. 19C is a sequence chart of the second embodiment;

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

First Embodiment

<Description of Entire System>

Figure 1:
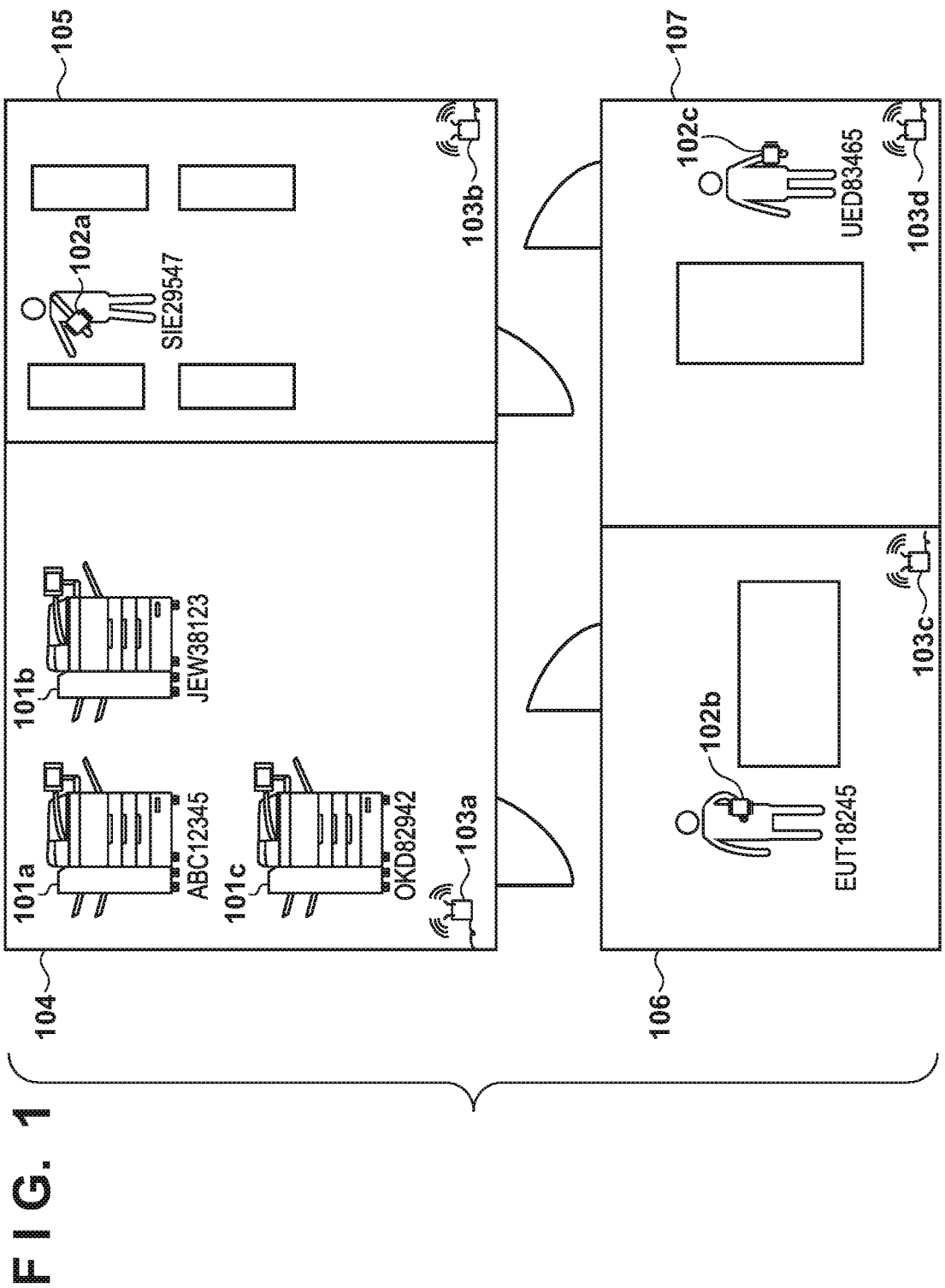
FIG. 1 is an explanatory view of the overall arrangement of a system according to an embodiment of the present invention.

FIG. 1 is a view showing an example of the overall arrangement of an error notification system according to this embodiment. In this embodiment, the system is formed by three MFPs 101 (101a, 101b, and 101c) installed in a printing room, and three mobile terminals 102 (102a, 102b, and 102c) that are error notification destinations and are connected via a wireless network. Hence, the system shown in FIG. 1 can also be called an image forming system. Note that at least one mobile terminal 102 suffices. The mobile terminal is sometimes called a portable terminal.

Each MFP 101 is an image forming apparatus as an error situation monitoring target and is installed in a printing room 104. The arrangement of the MFP 101 will be described in detail with reference to FIG. 2. In the description of this embodiment, a serial number is used as the identification information of each MFP 101, and the MFPs 101a, 101b, and 101c have serial numbers ABC12345, JEW38123, and OKD82942, respectively.

The mobile terminal 102 is an information terminal (also called a terminal device) as an error notification destination from the image forming apparatus. The arrangement of the mobile terminal 102 will be described in detail with reference to FIG. 6. In the description of this embodiment, a serial number is used as the identification information of each mobile terminal 102, and the mobile terminals 102a, 102b, and 102c have serial numbers SIE29547, EUT182145, and UED83465, respectively. The mobile terminals 102 are attached to different operators, and the operators are in a sheet warehouse 105, an inspection room 106, and a meeting room 107 that are different rooms.

Four access points 103 are wireless LAN clients connected to the same network. The MFPs 101 and the mobile terminals 102 are each connected to one of the access points and are connected to the same network via the access points. Note that the devices are connected to the same network here but need not always be connected to the same network. For example, the devices may be connected to different networks if the networks are connected to each other, like a plurality of networks connected to each other via a router.

In this embodiment, an example in which a smartwatch is used as the mobile terminal 102 of the error notification destination will be described. However, the mobile terminal 102 may be a smartphone or another wearable device. Each mobile terminal 102 is directly connected to the network via an access point. However, the mobile terminal 102 may be connected to a smartphone by short distance wireless communication using Bluetooth® and then connected to a network via the smartphone. An example in which the error notification system operates on the software of each MFP 101 will be described. However, an error notification system operating on a separately provided server may receive an error occurrence notification from the MFP 101, and the server may perform transmission to the mobile terminal 102.

<Description of Image Forming Apparatus>

Figure 2:
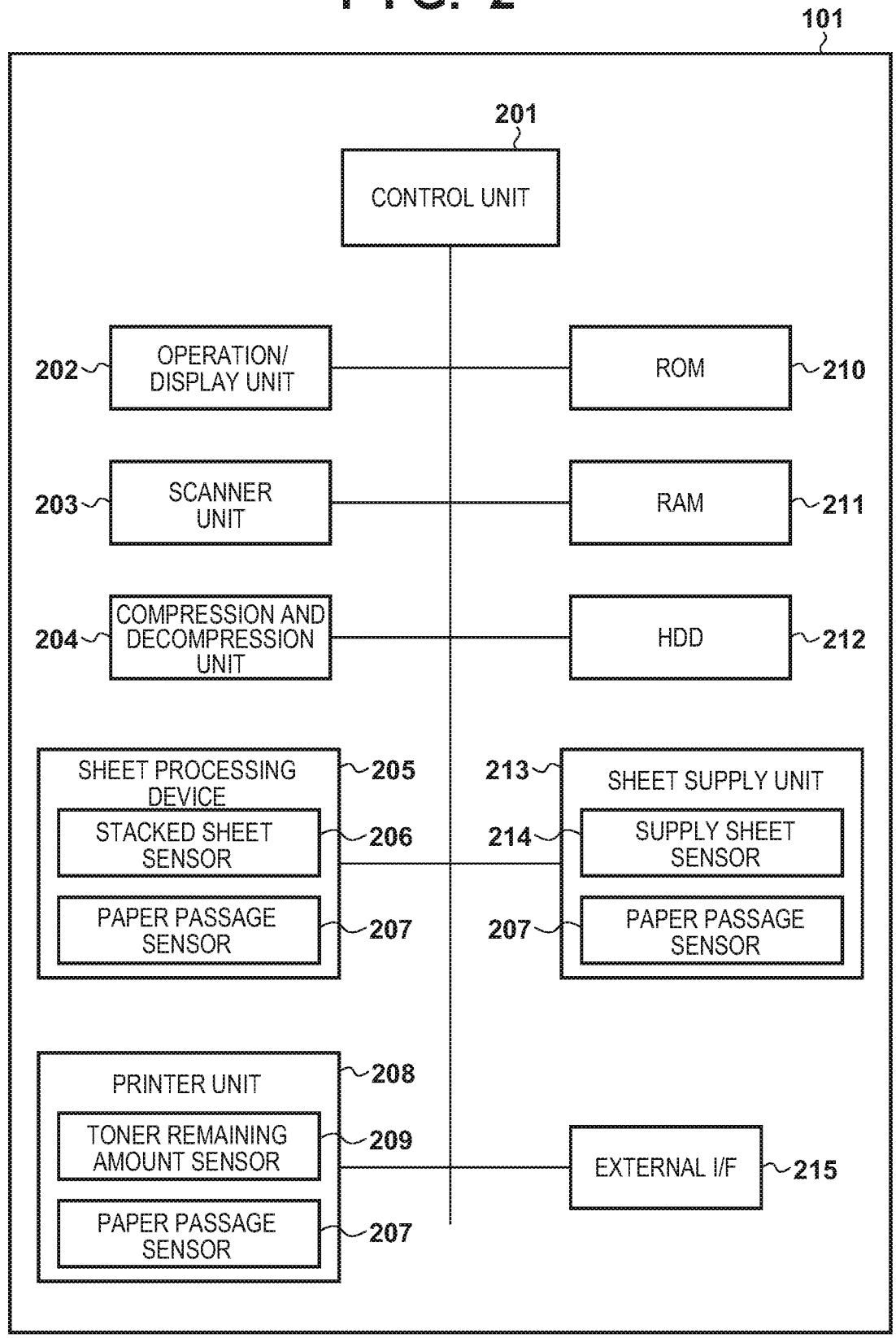
FIG. 2 is a block diagram showing the software module configuration of an MFP 101.

The arrangement (mainly the software configuration) of the MFP 101 according to the first embodiment will be described with reference to the system block diagram of FIG. 2. The MFP 101 incorporates a nonvolatile memory such as a hard disk 212 (to be referred to as an HDD hereinafter) capable of storing the data of a plurality of jobs as processing targets. Note that in the first embodiment, an example of the MFP 101 using a hard disk has been described. However, the memory is not limited to a hard disk as long as it is a similar nonvolatile storage device having a large capacity. In addition, the MFP 101 has a copy function of storing, in the HDD 212, data accepted from a scanner unit 203, reading out the data from the HDD 212, and printing it by a printer unit 208. The MFP 101 also has a printing function of storing, in the HDD 212, job data received from an external device via an external I/F 215 that is an example of a communication unit, reading out the data from the HDD 212, and printing it by the printer unit 208. The MFP 101 is a multi-function processing apparatus (MFP) having such a plurality of functions. The MFP 101 may be a color printer capable of printing in color or may be a monochrome printer capable of printing only monochromatically.

A control unit 201 includes a CPU. The CPU reads out programs stored in a ROM 210 and executes the programs, thereby causing the MFP 101 to execute various kinds of operations according to the first embodiment. The ROM 210 also stores a program used by the control unit 201 to execute an operation of interpreting page description language (to be referred to as a PDL hereinafter) data received from an external device via the external I/F 215 and rasterizing it into raster image data (bitmap image data). Similarly, the ROM 210 also stores a program used by the control unit 201 to interpret a job received from an external device via the external I/F 215 and process the job. These are processed by software. The control unit 201 stores, in the HDD 212, the data of a job as a processing target input via various kinds of input units such as the scanner unit 203 and the external I/F 215, reads out the data from the HDD 212, and outputs it to the printer unit 208 to print. In addition, the control unit 201 also controls to transmit job data read out from the HDD 212 to an external device via the external I/F 215. In this way, the control unit 201 executes various kinds of output processing of the data of a processing target job stored in the HDD 212. The control unit 201 also controls the operations of a sheet processing device 205 and a sheet supply unit 213. The external I/F 215 can also communicate with the mobile terminal 102 via a wireless communication device. In this example, the communication with the mobile terminal 102 is implemented by controlling the external I/F 215 and the wireless communication device by the control unit 201. Hence, these components will sometimes be referred to as a communication control unit or, concerning transmission, a transmission control unit.

An operation/display unit 202 is formed by a display unit, an operation unit, and a backlight unit, and provides a user interface. The display unit is formed by a liquid crystal display or the like, and displays an error screen shown in FIGS. 17A and 17B in accordance with an instruction from the control unit 201. The operation unit is formed by a touch panel, a switch, and the like. The backlight unit is formed by an LED or the like, and illuminates the display unit from the back side in accordance with an instruction from the control unit 201 such that the display unit can be seen even in a dark place.

The scanner unit 203 reads an original image, processes image data obtained by reading the original, and outputs the image data.

A compression and decompression unit 204 compresses or decompresses image data or the like stored in a RAM 211 or the HDD 212 using various kinds of compression methods such as JBIG and JPEG.

The sheet processing device 205 performs post-processing such as stapling and bookbinding for sheets S printed by the printer unit 208 and discharges the sheets. In addition, the sheet processing device 205 includes a stacked sheet sensor 206 and a paper passage sensor 207. The stacked sheet sensor 206 is a sensor configured to detect the sheet S discharged by the sheet processing device 205. The control unit 201 moves a stacking unit 341 (see FIG. 3) up and down based on the detection of the stacked sheet sensor 206. In a case in which the sheet S is detected even if the stacking unit 341 is lowered up to the limit of a movable unit 343 (see FIG. 3), it is determined that a discharge tray full has occurred.

The paper passage sensor 207 is a sensor provided in each of the sheet processing device 205, the printer unit 208, and the sheet supply unit 213, and detects that a sheet passes. Upon recognizing, based on the detection of the paper passage sensor 207, that the sheet S does not pass within a predetermined time or that the sheet S stays at one point for a predetermined time or more, the control unit 201 determines that a paper jam has occurred.

The printer unit 208 executes print processing of the data of a print job stored in the HDD 212. The printer unit includes a toner remaining amount sensor 209 and the paper passage sensor 207. The toner remaining amount sensor 209 is a sensor configured to detect a toner remaining amount. Upon receiving a detection representing the absence of toner from the toner remaining amount sensor 209, the control unit 201 determines that no toner remains.

The ROM 210 is a read only memory and stores, in advance, various kinds of programs such as a boot sequence and the above-described programs, and font information. The programs include programs configured to execute various kinds of processing of flowcharts (to be described later) to be executed by the control unit 201. Various kinds of control programs necessary in the first embodiment are stored. The ROM 210 also stores display control programs configured to display various kinds of UI screens including an operator interface screen (to be referred to as a UI screen hereinafter) on the display unit of the operation/display unit 202. The ROM 210 is a read-only memory, and stores in advance various programs such as a program for a boot sequence, font information, or the like, and the foregoing programs.

The RAM 211 is a readable/writable memory and stores image data sent from the scanner unit 203 or the external I/F 215, various kinds of programs and setting information, and the like.

The HDD 212 stores image data compressed by the compression and decompression unit 204. The HDD 212 is configured to hold a plurality of data such as print data of a job that is a processing target. Various kinds of management information permanently stored, changed, and managed by the MFP 101, and the like are also stored in the HDD 212.

The sheet supply unit 213 is a portion that supplies the sheet S to be used for printing to the printer unit. The sheet supply unit 213 includes a supply sheet sensor 214 and the paper passage sensor 207. The supply sheet sensor 214 is a sensor configured to detect the sheet S in the sheet supply unit 213. The control unit 201 moves a stacking board 325 up and down at the time of sheet supply or the like, and determines the presence/absence of a sheet based on the detection of the supply sheet sensor 214. In a case in which the supply sheet sensor 214 does not detect the sheet S even if the stacking board 325 is raised up to the limit, it is determined that a paper shortage (or a sheet shortage) has occurred.

The external I/F 215 transmits/receives image data or the like to/from a facsimile device, a network connection device, and an external dedicated device.

<Sectional View of Image Forming Apparatus>

Figure 3:
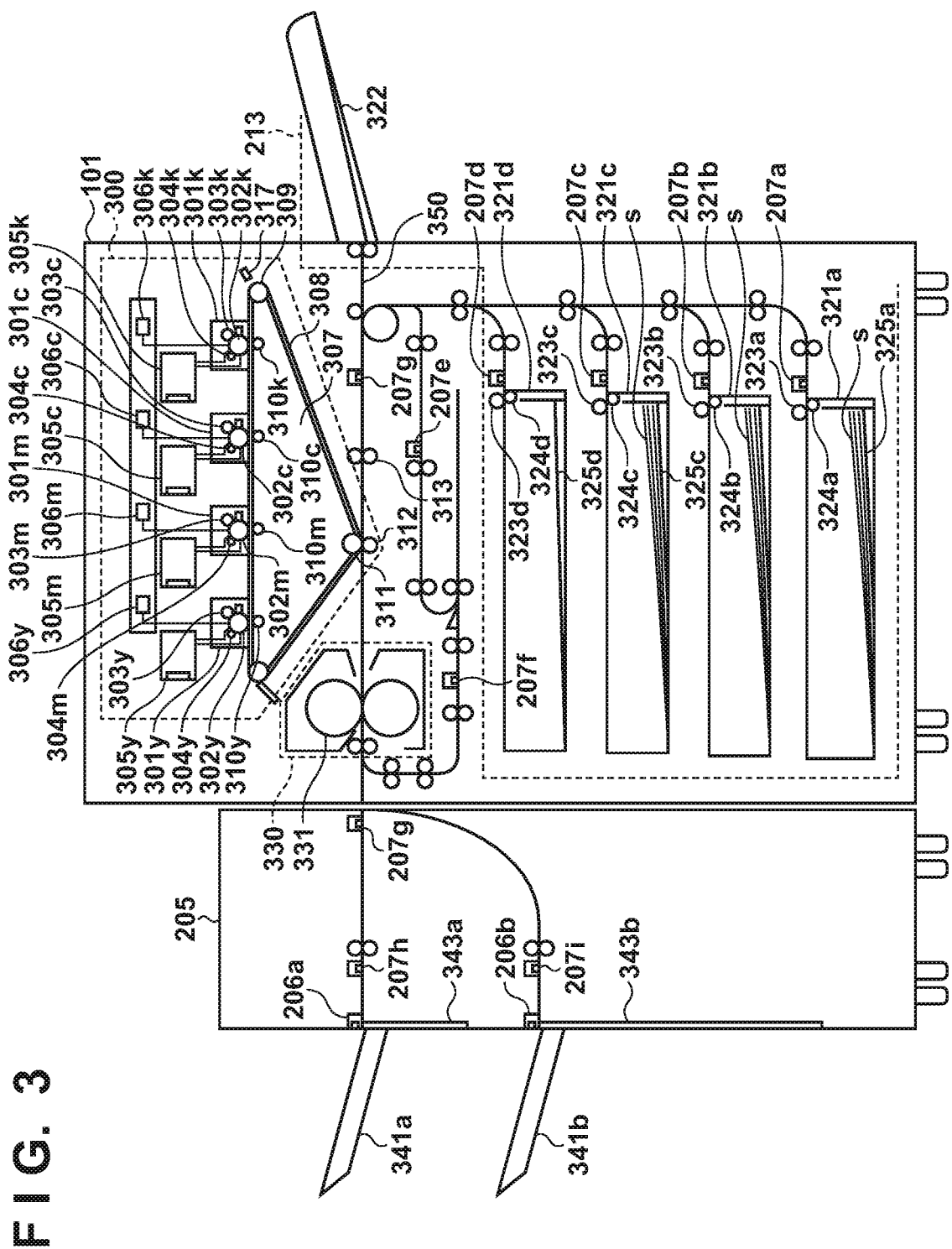
FIG. 3 is a sectional view of the MFP 101.

FIG. 3 is a sectional view of the MFP 101 according to the first embodiment. An image forming unit 300 includes process cartridges 301 corresponding to a plurality of toners. Here, four (black (K), cyan (C), magenta (M), and yellow (Y)) toners are provided, and the process cartridges 301 corresponding to them are provided. Note that in FIG. 3, symbols Y, M, C, and K representing the colors are added to components provided on a color component basis. In the description, however, the color symbols will be omitted. A photosensitive drum 302 that is an image carrier, a charge roller 303 configured to evenly charge the surface of the photosensitive drum 302, and a developing sleeve 304 configured to apply a toner to an electrostatic latent image formed on the photosensitive drum 302 and develop the toner image are arranged in the process cartridge 301. A toner storage unit 305 is a portion in which a toner container 401 is stored, and the toner is extracted from the container. A laser scanner 306 located above the process cartridge 301 draws a latent image on the photosensitive drum 302. An intermediate transfer unit 307 under the process cartridge 301 includes an intermediate transfer belt 308, a driving roller 309, a primary transfer roller 310 that brings the intermediate transfer belt 308 into contact with the photosensitive drum 302, and an inner roller 311. An outer roller 312 forms a transfer nip together with the inner roller 311. Registration rollers 313 control the timing to make the conveyed sheet enter the transfer nip. An intermediate transfer material cleaner 316 collects a residual toner that is left untransferred on the inner roller 311 and an adjustment toner image that is not intended to be transferred onto the sheet S. A pattern sensor 317 detects the edges of shade changes of a pattern formed on the intermediate transfer belt 308.

The sheet supply unit 213 includes sheet cassettes 321a to 321d and a manual feed tray 322. Note that in FIG. 3, symbols a, b, c, and d representing the sheet cassettes are added to components provided on a sheet cassette basis. In the description, however, the symbols will be omitted. The sheet cassette 321 includes the stacking board 325, a paper feed roller 323, and a retard roller 324. The stacking board 325 pushes the sheet S up to the paper feed roller 323, and the paper feed roller 323 picks up the uppermost sheet and delivers it to a conveyance path 350. The retard roller 324 separates the sheet picked up by the paper feed roller 323 to prevent a plurality of sheets from being discharged. The sheet that has passed the retard roller 324 is detected by the paper passage sensor 207 provided on the conveyance path.

A fixing device 330 includes a fixing roller 331 that rotates while heating the roller surface.

The sheet processing device 205 includes stacking units 341a and 341b, performs post-processing for the sheet S after printing, and discharges the sheet S to one of the stacking units 341a and 341b. Each stacking unit 341 includes the stacked sheet sensor 206 and the movable unit 343. The stacked sheet sensor 206 detects the sheet S stacked on the stacking unit 341. Upon accepting the detection, the control unit 201 lowers the stacking units 341a and 341b connected to movable units 343a and 343b, respectively, until the sheet S is not detected. In a case in which the sheet S is detected even if the stacking units 341a and 341b are lowered up to the lowermost positions of the movable units 343a and 343b, the control unit 201 determines that a discharge tray full has occurred in the stacking unit 341 of interest.

The conveyance path 350 is a path to convey the sheet S, and a plurality of paper passage sensors 207 are provided on the path. Paper passage sensor 207 is a sensor configured to detect the passage of the sheet S. Upon detecting the passage of the sheet, the paper passage sensor 207 located on the path on which the sheet S passes notifies the control unit 201 of it. In a case in which the passage of the sheet S is not detected for a predetermined time, or in a case in which the sheet S is continuously detected for a predetermined time or more, the control unit 201 determines that a paper jam has occurred.

<Sectional View of Toner Storage Unit>

Figure 4:
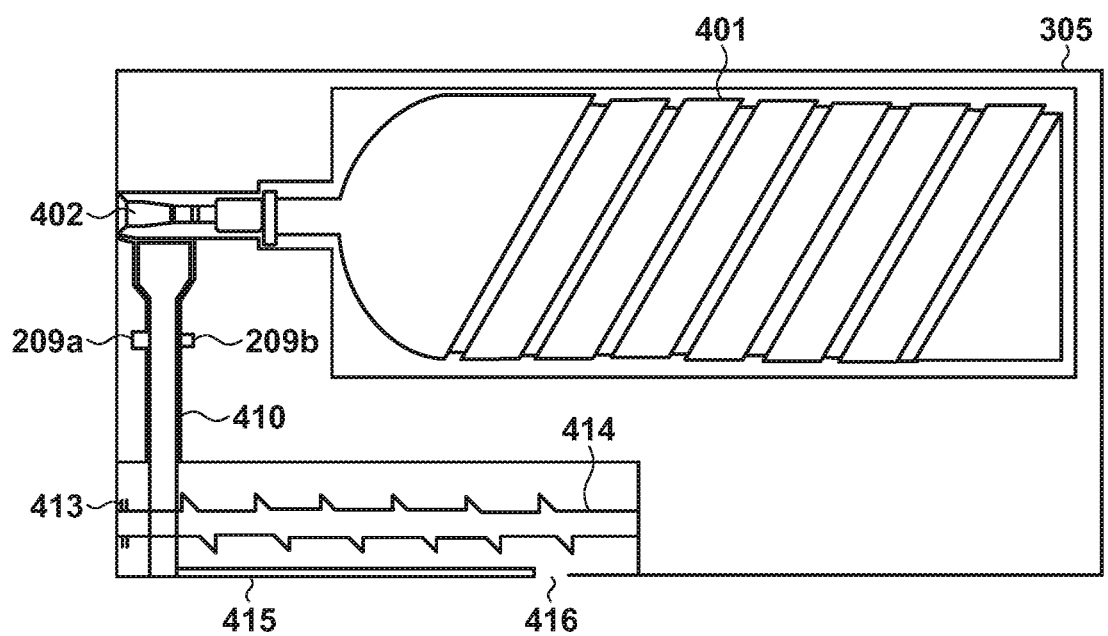
FIG. 4 is a sectional view of a toner storage unit 305.

FIG. 4 is a sectional view of the toner storage unit 305 according to the first embodiment. The toner container 401 is a detachable toner bottle. A helical groove is formed in the peripheral surface. When rotated by a toner container driving unit 402, the toner container 401 can supply a toner to a toner supply device 410.

The toner supply device 410 is equipped with toner remaining amount sensors 209a and 209b. The toner remaining amount sensors 209a and 209b are sensors configured to detect the remaining amount of the toner in the toner supply device 410. When the toner in the toner container 401 is exhausted, and supply of the toner stops, the toner stored in the toner supply device 410 is located below the positions of the toner remaining amount sensors 209a and 209b. Upon accepting detection of the exhaust of the toner from the toner remaining amount sensor 209, the control unit 201 determines that no toner remains. A toner conveyance pipe 415 with a supply screw 414 is arranged in the lower portion of the toner supply device 410. The supply screw 414 is rotated by a gear 413 and delivers the toner in the toner conveyance pipe 415 from a toner supply port 416. The toner delivered from the toner supply port 416 is supplied to the process cartridge 301.

<Sectional View of Sheet Cassette>

Figure 5:
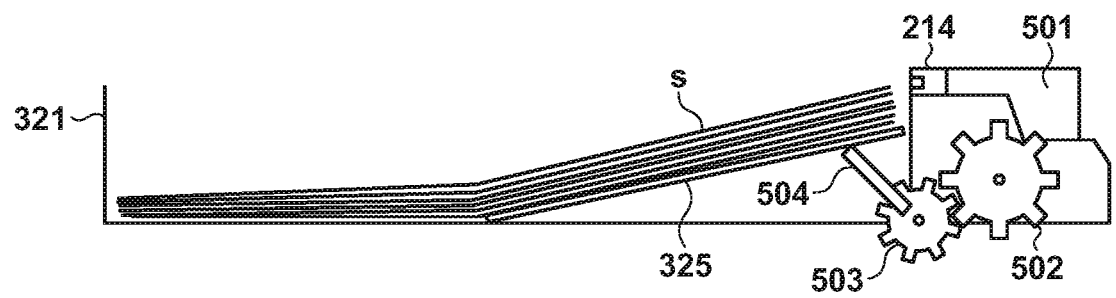
FIG. 5 is a sectional view of a sheet cassette 321.

FIG. 5 is a sectional view of the sheet cassette 321 according to the first embodiment. A lifter driving stepping motor 501 operates, via a pinion gear 502 and a sector gear 503, a lifter arm 504 installed under the stacking board 325. The sheet S stacked on the stacking board 325 is wholly or partially raised, and its leading edge thus comes into contact with the paper feed roller 323 (see FIG. 3). As described above, the sheet S is delivered to the conveyance path 350 by the paper feed roller 323.

The supply sheet sensor 214 detects the sheet S raised by the stacking board 325. In a case in which the sheet S is not detected by the supply sheet sensor 214 even if the lifter arm 504 is operated up to the upper limit, the control unit 201 determines that a paper shortage has occurred.

<Description of Mobile Terminal 102>

Figure 6:
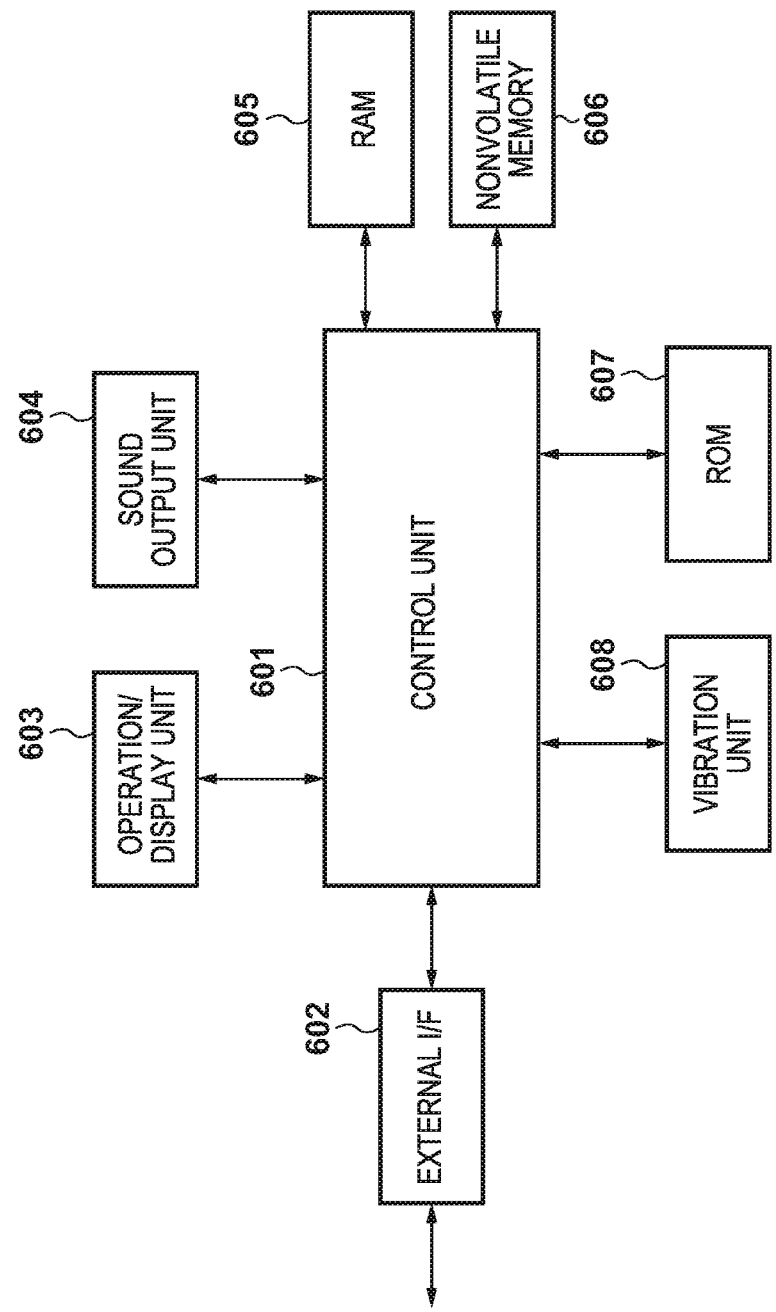
FIG. 6 is a block diagram showing the software module configuration of a mobile terminal 102.

The arrangement (mainly the hardware arrangement) of the mobile terminal 102 according to the first embodiment will be described with reference to the system block diagram of FIG. 6. The mobile terminal 102 includes a control unit 601 configured to control the operation of the terminal. The control unit 601 is connected to be able to control an external I/F 602, an operation/display unit 603, a sound output unit 604, a RAM 605, a nonvolatile memory 606, a ROM 607, and a vibration unit 608.

The CPU of the control unit 601 reads out programs stored in the ROM 607 and executes the programs, thereby causing the mobile terminal 102 to execute various kinds of operations according to the first embodiment. The external I/F 602 is connected to a network and transmits/receives messages to/from the MFP 101.

The operation/display unit 603 is formed by a display unit, an operation unit, and a backlight unit. The display unit is formed by a liquid crystal display or the like, and displays operations and setting screens to be described in detail with reference to FIGS. 8A to 8J in accordance with an instruction from the control unit 601. The operation unit is formed by a touch panel, a switch, a winding crown, and the like. The backlight unit is formed by an LED or the like, and illuminates the display unit from the back side in accordance with an instruction from the control unit 601 such that the display unit can be seen even in a dark place. Examples of operations will simultaneously be described with reference to FIGS. 8A to 8J.

The sound output unit 604 is formed by a speaker or the like. The sound output unit 604 generates a sound such as an alarm sound or a ringtone in accordance with an instruction from the control unit 601. It is possible to control generation, stop, and output loudness of the sound. Like the vibration unit, the sound output unit 604 is a portion used to generate an alarm sound or a ringtone such that the operator wearing the mobile terminal realizes the acceptance of an action request for an error.

The RAM 605 is used to temporarily store parameters and data used to execute a program. The nonvolatile memory 606 is formed by a flash memory or the like whose contents are held even if energization stops. Normally, the mobile terminal does not include an HDD from the viewpoint of size. The nonvolatile memory 606 is used to save various kinds of registration information and various kinds of setting information. The ROM 607 stores various kinds of programs. The control unit 601 executes processing in accordance with a program stored in the ROM 607, thereby implementing a function shown in this embodiment.

The vibration unit 608 vibrates the mobile terminal 102 in accordance with an instruction from the control unit 601. It is possible to control generation, stop, and magnitude of the vibration. The vibration unit 608 is a portion used to generate a vibration such that the operator wearing the mobile terminal realizes the acceptance of an action request for an error.

<Sequence Chart at Time of Message Transmission>

Figure 7A:
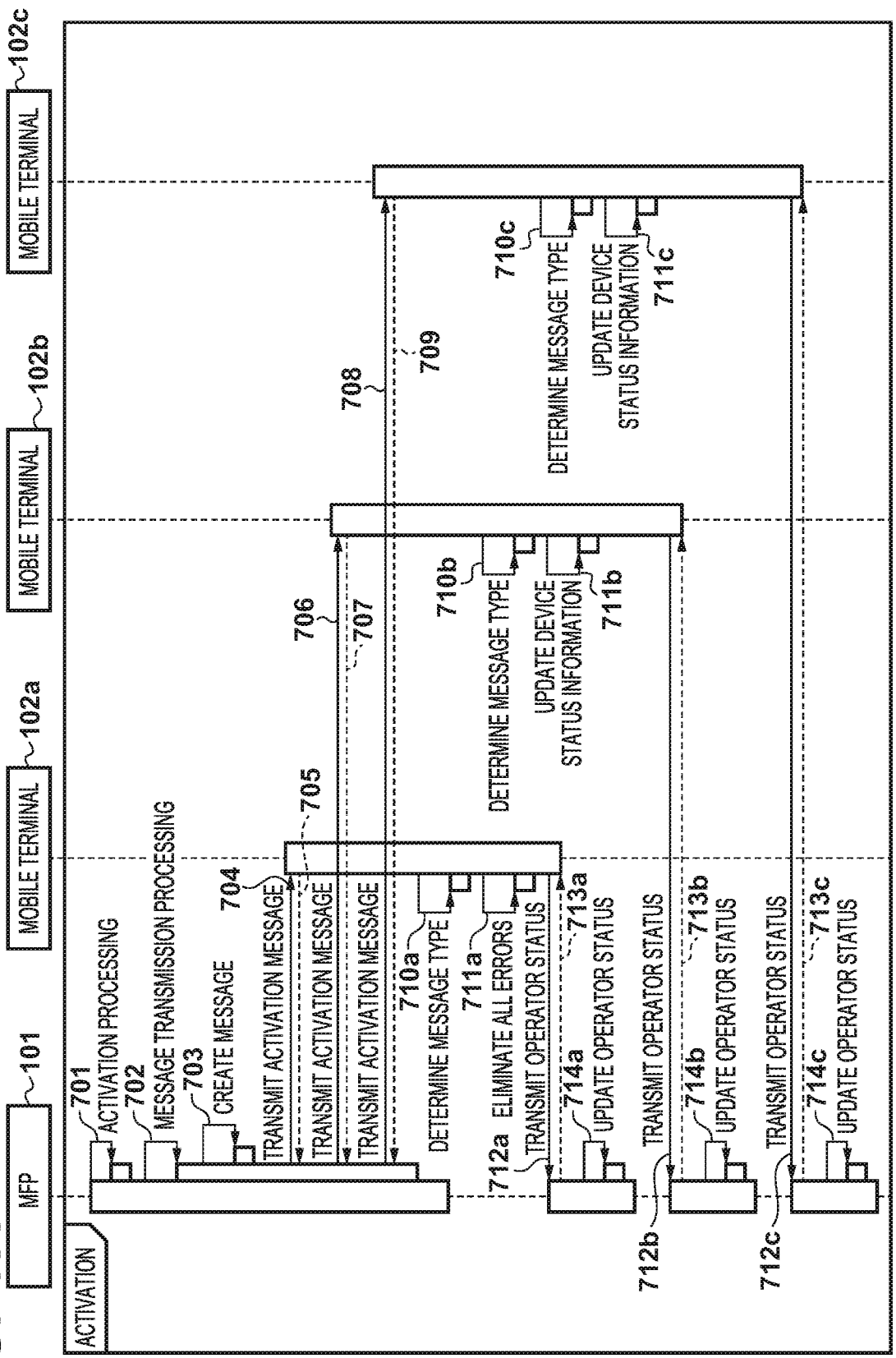
FIG. 7A is a sequence chart of the MFP 101 and the mobile terminals 102 according to the embodiment of the present invention at the time of activation.

FIGS. 7A to 7C are sequence charts of an example of processing of the MFP 101 and the mobile terminals 102 at the time of message transmission/reception. FIGS. 16A to 16D show examples of a request message 1600, a notification message 1610, an activation message 1620, and an elimination message 1630 transmitted by the MFP 101 in the sequence. Details of the messages will be described later with reference to FIGS. 16A to 16D. Additionally, in the sequence shown in FIGS. 7A to 7C, pieces of management information 900 of the mobile terminals shown in FIG. 9, which are managed by the MFP 101, and pieces of device status information 1000 shown in FIG. 10, which are managed by the mobile terminals are referred to.

Before the sequence shown in FIGS. 7A to 7C, each mobile terminal 102 completes registration processing in the MFP 101 in advance. By this registration processing, the pieces of management information of the mobile terminals 102 and the like, which are held by the manager of the MFP 101 or the like, are registered in the MFP 101. The registration can be performed, for example, from a computer connected to the MFP 101 or using the mobile terminal 102. An example of registration processing using the mobile terminal 102 will briefly be described.

First, a user activates an application for management on the mobile terminal 102. The mobile terminal 102 broadcasts a search message of an image forming apparatus such as the MFP 101 in accordance with an operation of the operator. Upon receiving the search message, the image forming apparatus transmits a response message including, for example, the address, ID, and installation location of its own. Upon receiving the response message, the mobile terminal 102 displays, on the screen, the image forming apparatus of the response message transmission source as an icon including, for example, the installation location, the ID, and the like. The user sees this and selects the image forming apparatus of the management target on the screen. The mobile terminal 102 transmits a registration message to the selected image forming apparatus. Upon receiving the registration message, the image forming apparatus registers the information of the mobile terminal of the registration message transmission source. The management information of the registered mobile terminal includes communication information such as identification information and an IP address. FIG. 9 shows an example of the management information of the registered mobile terminal. As shown in FIG. 9, the management information may further include the type of an error preferentially assigned to each mobile terminal and the status of the operator (manager). These pieces of information can be regarded as information concerning an error for which an action can be taken and is saved in association with each terminal device. Furthermore, the status of the operator may periodically be updated. This procedure will be described later in detail with reference to FIGS. 8A to 8J. The sequence shown in FIGS. 7A to 7C is executed between the MFP 101 and the mobile terminals 102 registered in the above-described way.

Referring to FIGS. 7A to 7C, transmission of a message is performed when the MFP 101 is activated, and when the occurrence or elimination of an error is determined by analyzing detection accepted from each of the stacked sheet sensor 206, the paper passage sensor 207, the toner remaining amount sensor 209, and the supply sheet sensor 214 during execution of a print job. At the time of activation, the activation message 1620 is transmitted to each mobile terminal 102. At the time of the occurrence of an error, a worker is decided, the request message 1600 is transmitted to the worker, and the notification message 1610 is transmitted to each of the remaining operators. At the time of elimination of an error, the elimination message 1630 is transmitted. The processing will be described below. Note that since the processing on the side of the MFP 101 is the same in all apparatuses, the description will be made concerning one MFP.

Activation Sequence

The processing of steps 701 to 714 includes the processing of the control unit 201 of the MFP 101, which is performed when the MFP 101 accepts an activation instruction, and the processing of the control unit 601 of each mobile terminal 102, which is performed when communication from the MFP 101 is accepted.

In step 701, the control unit 201 performs activation processing of the MFP 101. The activation processing is the same as normal processing.

In step 702, the control unit 201 starts message transmission processing. In step 703, the control unit 201 creates the activation message 1620. The activation message 1620 will be described with reference to FIG. 16C. In steps 704, 706, and 708, the control unit 201 of the MFP 101 transmits the activation message 1620 to each mobile terminal 102 via the external I/F 215. The order of transmission to the mobile terminals need not comply with a specific order. For example, the transmission can be done in the order of registration (for example, the registration order of the management information 900) in the MFP 101 by device registration processing to be described later. A plurality of messages may simultaneously be transmitted. Here, however, the messages are transmitted one by one. In steps 705, 707, and 709, the control unit 601 of each mobile terminal 102 transmits a response to the activation message 1620 to the MFP 101 via the external I/F 602. Note that if connection fails in the communication of step 704, 706, or 708, no response is transmitted, and the processing of steps 710 to 714 concerning the mobile terminal 102 is not executed.

The processing of steps 710 to 714 is executed by the control unit 601 of the mobile terminal 102 that has successfully received the activation message 1620. The processing is not executed in the mobile terminal 102 that has failed in receiving the activation message 1620. In addition, the processes executed in the mobile terminals 102a, 102b, and 102c are asynchronous, and the order of execution is not constant.

In step 710, the control unit 601 refers to identification information 1601 of the MFP 101 in the received message, and deletes all errors in a request situation 1014 and a notification situation 1015 of the MFP 101 whose identification information 1011 in the device status information 1000 stored in the RAM 605 matches the identification information 1601. In step 711, the control unit 601 changes screen display based on the device status information 1000 stored in the RAM 605. The screen to be displayed will be described with reference to FIGS. 8A to 8J. In step 712, the control unit 601 acquires the status of the operator stored in the RAM 605, and transmits an operator status change request to the MFP 101 from which the activation message 1620 is accepted via the external I/F 602. In step 713, the control unit 201 transmits a response to the operator status change request to the mobile terminal 102 via the external I/F 215. Note that if connection fails in the communication of step 713, no response is transmitted, and step 714 is not executed.

In step 714, the control unit 201 extracts the identification information of the mobile terminal and the status of the operator from the operator status change request, and updates a status 914 of the operator of the mobile terminal 102 whose identification information matches identification information 911 in the mobile terminal information 900 stored in the RAM 211.

The procedure up to this point is the procedure performed at the time of activation. After that, the MFP 101 can, for example, accept a print job or a copy job in accordance with the operation of the operator or can receive a print job from a remote computer or the like. FIGS. 7B and 7C show an example of the sequence at that time.

Printing Sequence

Steps 720 to 750 start when a print job or a copy job is accepted via the control unit 201 or the operation/display unit 202. In step 720, the control unit 201 executes the accepted print job. In step 721, the control unit 201 analyzes the contents of detection accepted from each of the stacked sheet sensor 206, the paper passage sensor 207, the toner remaining amount sensor 209, and the supply sheet sensor 214. The contents of detection have been described with reference to FIGS. 3, 4, and 5. If the detection of each sensor indicates the occurrence of an error, steps 722 to 750 are executed.

In step 722, the control unit 201 starts message transmission processing. In step 723, the control unit 201 performs worker decision processing. The worker decision processing will be described with reference to FIG. 15. In step 724, the control unit 201 creates the request message 1600 and the notification message 1610. The request message 1600 and the notification message 1610 will be described with reference to FIGS. 16A to 16D. In step 725, the control unit 201 transmits, via the external I/F 215, the request message 1600 to the mobile terminal 102 decided to the worker in step 723. In the example shown in FIG. 7B, the mobile terminal 102*a* is decided to the worker. In step 726, the control unit 601 transmits a response to the request message 1600 to the MFP 101 via the external I/F 602. If the transmission of the request message 1600 in step 725 fails, step 726 is not executed, and the control unit 201 of the MFP 101 redoes the processing from step 723. The transmission of the request message 1600 is always performed before the transmission of the notification message 1610, and the processing from step 727 is not executed until the transmission of the request message 1600 succeeds.

In steps 727 and 729, the control unit 201 of the MFP 101 transmits the notification message 1610 to each of the mobile terminals 102 other than the worker via the external I/F 215. The order of transmission to the mobile terminals 102 need not comply with a specific order. A plurality of messages may simultaneously be transmitted. Here, however, the messages are transmitted one by one. In steps 728 and 730, the control unit 601 of each mobile terminal 102 transmits a response to the notification message 1610 to the MFP 101 via the external I/F 602. Note that if connection fails in the communication of step 727 or 729, no response is transmitted, and the processing of steps 731 and 732 concerning the mobile terminal 102 is not executed.

The processing of steps 731 and 732 is executed by the control unit 601 of the mobile terminal 102 that has successfully received the request message 1600 or the notification message 1610. The processing is not executed in the mobile terminal 102 that has failed in receiving the request message 1600 or the notification message 1610. In addition, the processes executed in the mobile terminals 102*a*, 102*b*, and 102*c* are asynchronous, and the order of execution is not constant. In step 731, the control unit 601 of the mobile terminal 102 adds the error of an error type 1603 in the request situation 1014 or the notification situation 1015 of the MFP 101 whose identification information 1011 in the device status information 1000 stored in the RAM 605 matches the identification information 1601 in the received message. In step 732, the control unit 601 of the mobile terminal 102 changes screen display based on the device status stored in the RAM 605. The screen to be displayed will be described with reference to FIGS. 8A to 8J.

After the transmission of the request message 1600 or the notification message 1610, in step 733, the control unit 201 of the MFP 101 interrupts the print job. Note that the control unit 201 may first interrupt the job after the error occurrence and then create and transmit various kinds of messages.

In step 740, the control unit 201 analyzes the contents of detection accepted from each of the stacked sheet sensor 206, the paper passage sensor 207, the toner remaining amount sensor 209, and the supply sheet sensor 214. When it is determined as the result of analysis that the error is eliminated, steps 741 to 750 are executed.

In step 741, the control unit 201 starts message transmission processing. In step 742, the control unit 201 creates the elimination message 1630. The elimination message 1630 will be described with reference to FIG. 16D. In steps 743, 745, and 747, the control unit 201 of the MFP 101 transmits the elimination message 1630 to each mobile terminal 102 via the external OF 215. The order of transmission to the mobile terminals 102 need not comply with a specific order. A plurality of messages may simultaneously be transmitted. Here, however, the messages are transmitted one by one. In steps 744, 746, and 748, the control unit 601 of each mobile terminal 102 transmits a response to the elimination message 1630 to the MFP 101 via the external I/F 602. Note that if connection fails in the communication of step 743, 745, or 747, no response is transmitted, and the processing of steps 749 and 750 concerning the mobile terminal 102 is not executed.

In step 749, the control unit 601 of the mobile terminal 102 deletes an error matching the error type 1603 from the request situation 1014 or the notification situation 1015 of the MFP 101 whose identification information 1011 in the device status information 1000 stored in the RAM 605 matches the identification information 1601 in the received message. In step 750, the control unit 601 of the mobile terminal 102 changes screen display based on the device status information 1000 stored in the RAM 605. The screen to be displayed will be described with reference to FIGS. 8A to 8J.

By the sequence shown in FIGS. 7A to 7C, upon detecting an error during execution of a job, the MFP 101 decides the mobile terminal of the worker who takes an action for the error. The MFP 101 then transmits a work request message to the decided mobile terminal, and transmits an error notification message to each of the remaining mobile terminals. This can implement an efficient and quick action for an error (for example, a recovery operation) via the message received by the mobile terminal.

<Description of Screen Displayed on Operation/Display Unit 603>

FIGS. 8A to 8J are schematic views of screens displayed on the operation/display unit 603 of the mobile terminal 102 in the error notification system according to this embodiment. FIG. 8A shows a standby screen 800. FIG. 8B shows a registered device selection screen 810. FIG. 8C shows a request priority assignment error type selection screen 820. FIG. 8D shows a device registration confirmation screen 830. FIG. 8E shows a standby screen 840 after registration. FIG. 8F shows a device status display screen 850. FIG. 8G shows an operator status change screen 860. FIG. 8H shows a standby screen 870 after error occurrence. FIG. 8I shows a device status display screen 880 after error occurrence. FIG. 8J shows a request screen 890.

As described above, an operation from the operator to the operation/display unit 603 is transmitted to the control unit 601 via the operation/display unit 603. As for a screen to be displayed on the operation/display unit 603, transition is executed under the control of the control unit 601. Examples of screens displayed on the operation/display unit 603, the operation of the operator, and the display screen transition of the operation/display unit 603 by an input accepted from the external I/F 602 will be described.

When the operator operates the operation/display unit 603 to accept an activation request for the error notification system, the standby screen 800 shown in FIG. 8A is displayed. The standby screen 800 is a screen that displays the list of MFPs 101 registered as status monitoring targets and allows the user to easily confirm whether an error has not occurred in each device. Each screen is displayed by a dedicated application, a common web browser, a notification information region, or the like.

A registered device display region 801 is a display region configured to display the MFPs 101 registered as the status monitoring targets and allow the user to confirm whether an error has not occurred in each MFP 101. The display is decided by referring to the device status information 1000 stored in the RAM 605. In the example shown in FIG. 8A, the MFP 101a identified by the serial number ABC12345 is assigned to a registered device display region (1) 801a, and no MFP 101 is assigned to a registered device display region (2) 801b, a registered device display region (3) 801c, and a registered device display region (4) 801d. In the device status information 1000 (see FIG. 10) at this time, one MFP 101 is registered. The identification information 1011 has ABC12345, the display region 1013 has 1, and no error exists in the request situation 1014 and the notification situation 1015. In the registered device display region (1) 801a to which the MFP 101 is assigned, the serial number is displayed as the identification information of the device. The color of the registered device display region (1) 801a is changed so as to be easily distinguishable from the display regions to which no device is assigned. A region to which a device is assigned accepts a selection operation and a long-time pressing operation. A region to which no device is assigned accepts only a long-time pressing operation. When the long-time pressing operation is accepted, the screen transitions to the registered device selection screen 810 shown in FIG. 8B. When the selection operation is accepted, the screen transitions to device status display screen 850 shown in FIG. 8F.

The standby screen 800 accepts a swipe operation at an arbitrary place. The fifth and subsequent registered device display regions are displayed by the swipe operation from right to left. The first to fourth registered device display regions are displayed by the swipe operation from left to right. In this example, four registered device display regions are displayed at maximum in one screen. However, the number of display regions may be changed in accordance with the size of the operation/display unit 603. The screen transitions to the operator status change screen 860 in FIG. 8G by the swipe operation from above to below.

When the device status information 1000 is changed, the display is updated based on the device status information 1000 after the change.

When the registered device display region 801 accepts the long-time pressing operation in FIG. 8A described above, the operation/display unit 603 transitions to the registered device selection screen 810 shown in FIG. 8B. The registered device selection screen 810 is a screen used to select the MFP 101 to be assigned to the registered device display region 801. The example in FIG. 8B shows a screen displayed when the long-time pressing operation is accepted in the registered device display region (2) 801b.

A registered device selection button 811 is a button used to select the MFP 101 to be assigned to the selected registered device display region 801. When the registered device display region 801 accepts the long-time pressing operation, a search request is transmitted in step S1101 of FIG. 11A to be described later. The information of each registrable MFP 101 is acquired by accepting a response to the request from the MFP. In registered device selection buttons 811a to 811c, the pieces of acquired identification information of the MFPs 101 are displayed. Each registered device selection button 811 accepts the selection operation, and the device is marked as selected. In addition, the button that has accepted the selection operation is displayed in a color changed. The plurality of registered device selection buttons 811 never simultaneously change to the selected state. In a case in which a registered device selection button 811 is selected when another registered device selection button 811 is already in the selected state, the selected state is canceled, and the newly selected registered device selection button 811 changes to the selected state. In FIG. 8B, buttons used to select the MFPs 101a, 101b, and 101c, respectively, are displayed, and the registered device selection button (2) 811b that is the button used to select the MFP 101b is in the selected state. Additionally, in a case in which the transition occurs by accepting the long-time pressing operation in the registered device display region 801 to which the device is already assigned, the registered device selection button 811 of the corresponding device is in the selected state as the initial state. The number of registered device selection buttons 811 increases/decreases depending on the number of registrable MFPs 101. For example, if the power of the MFP 101c is off, the registered device selection button (3) 811c is not displayed. If an MFP other than the three MFPs 101 shown in FIG. 1 is installed, the registered device selection button 811 corresponding to the device is displayed. The order of MFPs to be displayed is the order of request acceptance, and the MFPs may be sorted by the name or the like.

The swipe operation is accepted at an arbitrary place of the screen. When the swipe operation from left to right is accepted, assignment of the MFP 101 to the selected registered device display region 801 is stopped, the screen transitions to the standby screen 800. When the swipe operation from right to left is accepted in a state in which the registered device selection button 811 in the selected state exists, the screen transitions to the request priority assignment error type selection screen 820 shown in FIG. 8C. If the registered device selection button 811 in the selected state does not exist, the operation is ignored. When the swipe operation from left to right is accepted in a case in which the registered device selection button 811 in the selected state does not exist, in a case in which the registered device display region 801 to which the MFP 101 is already assigned is selected, and the transition occurs, a cancel request is transmitted to the corresponding MFP 101. Upon receiving the cancel request, the MFP 101 erases the mobile terminal of the cancel request transmission source from the management information, and transmits a response representing the success of cancel to the mobile terminal. Upon receiving the response representing the success, the mobile terminal 102 deletes the MFP 101 of the matched identification information 1011 from the device status information 1000 stored in the RAM 605, and displays the standby screen 800 shown in FIG. 8A in accordance with the device status information 1000 after the change. If the transmission of the cancel request fails, or a response representing a failure is received, the mobile terminal 102 displays a cancel failure screen (not shown) and, after the display, transitions to the standby screen 800 shown in FIG. 8A. When the swipe operation from below to above is accepted, in a case in which there are many registrable devices, and a registered device selection button 811 that does not fit in the screen exists, the screen is displayed by scroll. When the swipe operation from above to below is accepted, scroll is performed in a reverse direction.

When the swipe operation from right to left is accepted in a state in which the registered device selection button 811 in the selected state exists in FIG. 8B described above, the operation/display unit 603 transitions to the request priority assignment error type selection screen 820 shown in FIG. 8C. The request priority assignment error type selection screen 820 is a screen used to select the type of an error for which an action request is preferentially accepted when an error occurs in the MFP 101 selected by the registered device selection button 811 in the above-described registered device selection screen 810. A method of deciding an operator to transmit the action request will be described in detail with reference to FIGS. 11A and 11B.

A request priority assignment error type selection button 821 is a button used to select an error type for which an action request is preferentially accepted. Each request priority assignment error type selection button accepts a selection operation, and the button that has accepted the selection operation is displayed in a color changed. A plurality of buttons can simultaneously be set in the selected state. When an already selected button accepts the selection operation, the selected state is canceled. In this example, request priority assignment error type selection buttons 821*a*, 821*b*, 821*c*, 821*d*, and 821*e* correspond to "paper shortage", "paper jam", "no toner remains", "discharge tray full", and "service call", respectively. The error types need not be limited to those shown here.

The swipe operation is accepted at an arbitrary place of the screen. When the swipe operation from right to left is accepted, the screen transitions to the device registration confirmation screen 830 shown in FIG. 8D. When the swipe operation from left to right is accepted, the screen transitions to the registered device selection screen 810 shown in FIG. 8B. When the swipe operation from below to above is accepted, in a case in which there are many selectable error types, and a request priority assignment error type selection button that does not fit in the screen exists, the screen is displayed by scroll. When the swipe operation from above to below is accepted, scroll is performed in a reverse direction.

When the swipe operation from right to left is accepted in FIG. 8C described above, the operation/display unit 603 transitions to the device registration confirmation screen 830 shown in FIG. 8D. The device registration confirmation screen 830 is a screen configured to confirm the registered device display region 801, the registered device selection button 811, and the request priority assignment error type selection button 821 that are selected.

A device confirmation display region 831 is a display region configured to display the MFP 101 selected in FIG. 8B. The identification information of the MFP 101 corresponding to the button selected by the registered device selection button 811 in FIG. 8B is displayed. In this example, since the registered device selection button (2) 811*b* is selected, the serial number of the MFP 101*b* is displayed.

A request priority assignment error type confirmation display region 832 is a region configured to display the error type selected in FIG. 8B, for which a request is preferentially accepted. The error type corresponding to the button selected by the request priority assignment error type selection button 821 in FIG. 8C is displayed. In this example, since the request priority assignment error type selection buttons (1) 821*a*, (2) 821*b*, and (4) 821*d* are selected, character strings representing "paper shortage", "paper jam", and "discharge tray full" are displayed.

An OK button 833 is used to end the registration of the MFP 101 in the registered device display region 801. When selection of the OK button 833 is accepted, assignment processing based on the selection is executed. In step S1108 to be described later, a registration request is transmitted to the MFP 101. When a response representing that the registration has succeeded is received from the MFP 101, the information of the MFP 101 is added to or updated in the device status information 1000 stored in the RAM 605, and the screen transitions to the standby screen 800 based on the device status information 1000 after the change. Here, for the descriptive convenience, the description will be made using the standby screen 840 after registration shown in FIG. 8E as an example in a case in which the MFP 101*b* is registered in the registered device display region (2) 801*b*. In a case in which no response is returned from the MFP 101 for a predetermined time or in a case in which a response representing a registration failure is received, a registration failure screen (not shown) is displayed and after that, the screen transitions to the standby screen 800 shown in FIG. 8A. In this case, the registration operation of the MFP 101 is not stored.

A Cancel button 834 is used to end the registration of the MFP 101 in the registered device display region. When selection of the Cancel button 834 is accepted, the screen transitions to the standby screen 800 shown in FIG. 8A without storing the registration operation of the MFP 101.

As described above, the standby screen 840 after registration is the same as the standby screen 800 shown in FIG. 8A except that the device is already registered in the display region (2) as well, and is a screen in which the MFP 101 is assigned to the registered device display region (2) 801*b* by the registration operation. This screen is the same such as that described with reference to FIG. 8A, and a detailed description thereof will be omitted.

When the registered device display region 801 in the standby screen 800, to which the MFP 101 is assigned, accepts the selection operation, the screen transitions to the device status display screen 850 shown in FIG. 8F. The device status display screen 850 is a screen configured to display the status of the MFP 101 stored in association with the selected registered device display region 801. An example in which the registered device display region (1) 801a is selected will be described here. The device status display screen 850 is displayed based on the device status information 1000 stored in the RAM 605.

A error occurrence status display region 851 is a region configured to display an error that occurs in the MFP 101. Each region corresponds to one error, and an error that has occurred is displayed in a color changed. That is, the error occurrence status display region 851 corresponding to an error included in the request situation 1014 or the notification situation 1015 of the device status information 1000 is displayed in an inverted color. The device status display screen 850 indicates that no error has occurred.

The swipe operation is accepted at an arbitrary place of the screen. When the swipe operation from left to right is accepted, the screen transitions to the standby screen 800 shown in FIG. 8A. When the swipe operation from below to above is accepted, in a case in which there are many selectable error types, and a request priority assignment error type selection button that does not fit in the screen exists, the screen is displayed by scroll. When the swipe operation from above to below is accepted, scroll is performed in a reverse direction.

When the device status information 1000 is changed, the display is updated based on the device status information 1000 after the change.

When the swipe operation from above to below is accepted in FIG. 8A described above, the operation/display unit 603 transitions to the operator status change screen 860 shown in FIG. 8G. The operator status change screen 860 is a screen used to select whether the operator wearing the mobile terminal 102 is in a status capable of accepting an action request for an error.

An Available button 861 is a button used to select an operator status and is a button configured to change the status to a status capable of accepting a request to take an action for an error. When the selection operation for the Available button 861 is accepted, the status of the operator is changed to the status capable of accepting a request and stored in the RAM 605. After the status is stored, an operator status change request is transmitted to all the MFPs 101 registered in the device status information 1000 stored in the RAM 605. The operator status change request includes at least the identification information of the mobile terminal 102, and information representing that a work, operation, or procedure is possible as the operator status. After the transmission, the screen transitions to the standby screen 800 shown in FIG. 8A.

A Busy button 862 is a button used to select an operator status and is a button configured to change the status to a status incapable of accepting an action request. When the selection operation for the Busy button 862 is accepted, the status of the operator is changed to the status incapable of accepting a request and stored in the RAM 605. After the status is stored, an operator status change request is transmitted to all the MFPs 101 registered in the device status information 1000 stored in the RAM 605. The operator status change request includes at least the identification information of the mobile terminal 102, and information representing that a work is impossible as the operator status.

After the transmission, the screen transitions to the standby screen 800 shown in FIG. 8A.

When the notification message 1610 is received from a registered device during display of the standby screen 840 after registration, the screen transitions to the standby screen 870 after error occurrence shown in FIG. 8H. FIG. 8H shows an example when the notification message 1610 is received from the MFP 101. The standby screen 870 after error occurrence is the same as the standby screen 800 shown in FIG. 8A, and a registered device display region (2) 871b corresponding to the registered device display region (2) 801b is changed to a display indicating an error occurrence. When the selection operation is accepted in the registered device display region (2) 871b of the error occurrence display, the screen transitions to the device status display screen 880 after error occurrence shown in FIG. 8I.

Details of the rest are the same as described with reference to FIG. 8A, and a description thereof will be omitted.

When the selection operation is accepted in a registered device display region 871 of error display in the standby screen 870 after error occurrence shown in FIG. 8H, in a case in which the request situation 1014 of the MFP 101 in the device status information 1000 does not include an error, the screen transitions to the device status display screen 880 after error occurrence shown in FIG. 8I. FIG. 8I shows an example when the registered device display region (2) 871b is selected in FIG. 8H, and the error whose notification is received is a paper jam. The device status display screen 880 after error occurrence is the same as the device status display screen 850 shown in FIG. 8F. In this screen, an error occurrence status display region (2) 881b corresponding to a paper jam that is an error that has occurred is changed to an error display.

The swipe operation is accepted at an arbitrary place of the screen. When the swipe operation from left to right is accepted, the screen transitions to the standby screen 870 after error occurrence shown in FIG. 8H.

When the request message 1600 is received from the registered device, the screen transitions to the request screen 890 shown in FIG. 8J. In addition, when the selection operation for the registered device display region 871 of error display is accepted in the standby screen 870 after error occurrence shown in FIG. 8H, in a case in which the request situation 1014 of the corresponding MFP 101 in the device status information 1000 includes an error, the screen transitions to the request screen 890 shown in FIG. 8J.

The request screen 890 is a screen configured to show that an action request for an error is received. FIG. 8J shows an example when a paper jam has occurred in the MFP 101b.

An action request message 891 includes character strings configured to indicate the MFP 101 that has transmitted the request message 1600 and the error type for which an action is requested. Pieces of information concerning the MFP 101, such as the name and the installation location, the name and the error number of the error that has occurred, and like are displayed in addition to the identification information of the device.

The swipe operation is accepted. When the swipe operation from left to right is accepted, the screen transitions to the standby screen 870 after error occurrence.

If the activation message 1620 or the elimination message 1630 is accepted during display of the request screen 890 and the corresponding error is deleted from the request situation 1014 in the device status information 1000, the screen transitions to the standby screen 800 shown in FIG. 8A. If another error exists in the request situation 1014, the screen transitions to the request screen 890 concerning the error. If the activation message 1620 for the device is received, the screen transitions to the standby screen 800 shown in FIG. 8A.

Even in a case in which the activation message 1620 or the elimination message 1630 is accepted during display of the standby screen 870 after error, if all errors are eliminated, all error statuses (the notification situation 1015 or the request situation 1014 in the device status information shown in FIG. 10) are erased, and the screen transitions to the standby screen 800 shown in FIG. 8A. If an uneliminated error remains, an error status of an erase target is erased, but the standby screen 870 after error is maintained.

Figure 22:
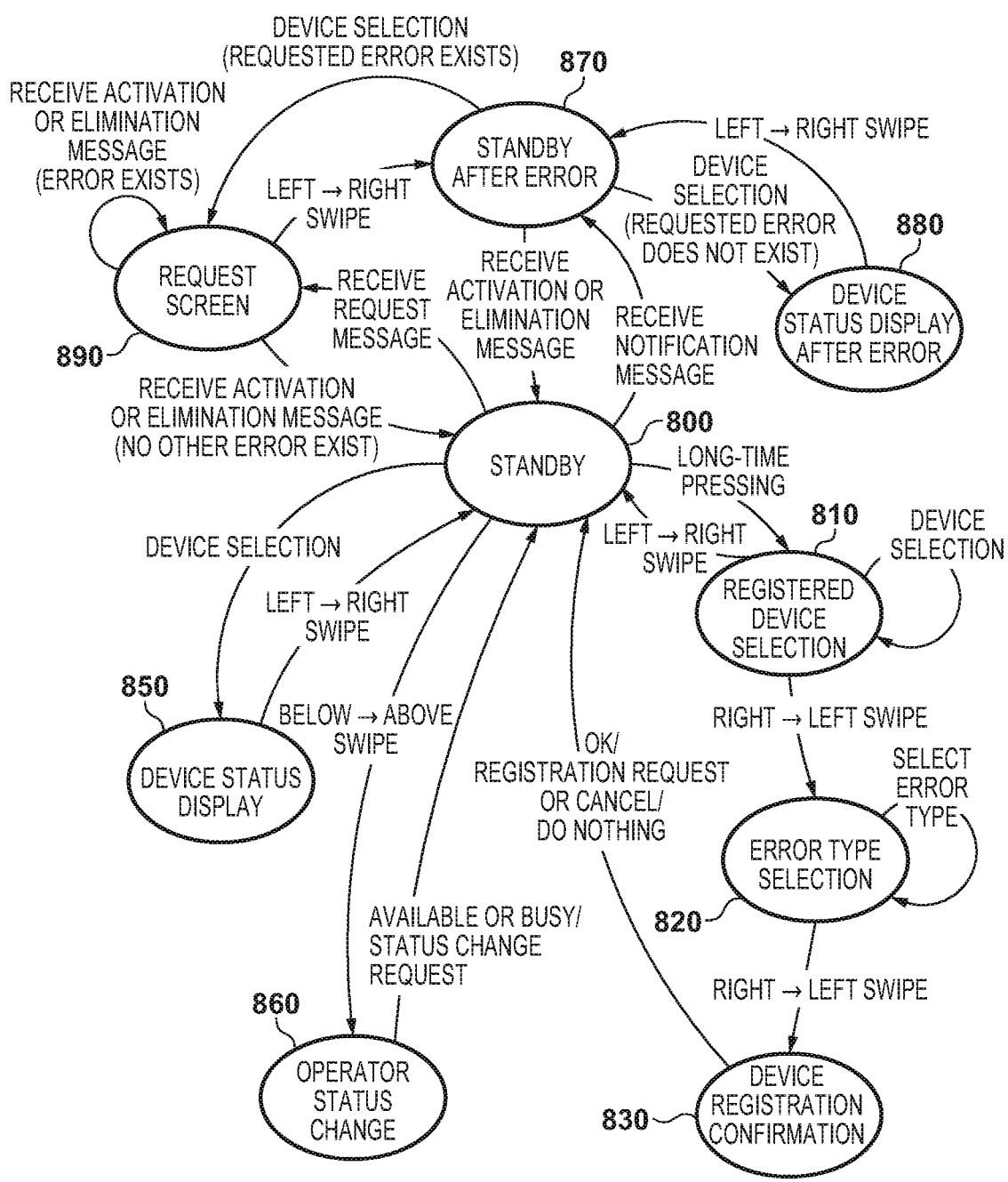
FIG. 22 is a view showing the status transition of the mobile terminal according to the first embodiment.

FIG. 22 shows the screen transition (or status transition) of the mobile terminal shown in FIGS. 8A to 8J. Each circle indicates a status, and each arrow indicates a status transition. A character string added to each status transition is an input serving as the trigger of the status transition, and "/" represents an output. Not all outputs are shown, and display outputs in the statuses after transition are omitted. As for the inputs as well, screen scroll and the like are omitted. In addition, some of the conditions described above are omitted in FIG. 22.

<Management Information of Mobile Terminal>

FIG. 9 shows the management information 900 of the mobile terminal 102 registered as an error notification destination managed in the RAM 211 by the MFP 101. When the information in the RAM 211 is updated, the same information is stored in the HDD 212 as well. The information is loaded from the HDD 212 into the RAM 211 in the activation processing (step S1301 in FIG. 13) of the MFP 101. Each registered terminal information 901 corresponds to one mobile terminal 102. Pieces of registered terminal information 901a, 901b, and 901c correspond to the mobile terminals 102a, 102b, and 102c, respectively.

The identification information 911 is identification information capable of uniquely identifying the mobile terminal 102. The control unit 201 refers to the identification information 911, thereby determining to which mobile terminal 102 the registered terminal information 901 corresponds.

Communication information 912 is information necessary to perform communication with the mobile terminal 102. In the embodiment, the communication information 912 is the IP information of the mobile terminal. The necessary information changes depending on the communication method to be used.

A request priority assignment error type 913 and the operator status 914 are pieces of information used when deciding a worker. These pieces of information are information concerning the operator associated with each mobile terminal. When deciding a worker, the control unit 201 refers to the operator status 914 set based on the status transmitted by the mobile terminal 102 in the operator status change screen 860 and sets the mobile terminal 102 that is capable of performing a work (Available). Next, the control unit 201 refers to the request priority assignment error type 913, and preferentially decides, as the worker, the mobile terminal 102 for which the error type determined from the detection information is included in the request priority assignment error type 913. This procedure will be described concerning steps S1502 and S1503 shown in FIG. 15. In the example shown in FIG. 9, when the error that has occurred is a paper shortage (NO PAPER), the mobile terminal 102a (SIE29547) is decided as the worker, and when the error is a paper jam (JAM), the mobile terminal 102b (EUT182145) is decided as the worker. The request priority assignment error type represents the type of an error for which the operator associated with the mobile terminal 102 preferentially takes an action (that is, takes an action with priority). In a case in which a mobile terminal to preferentially take an action is absent or is exhausted, a mobile terminal that does not preferentially take an action may be decided as a terminal capable of performing a work.

<Management Information of Device Status>

FIG. 10 shows the device status information 1000 stored in the RAM 605 of the mobile terminal 102. When the information in the RAM 605 is updated, the same information is stored in the nonvolatile memory 606 as well. The information is loaded from the nonvolatile memory 606 into the RAM 605 in the activation processing of the application. Each registered device status information 1001 is the device status information of one MFP 101. Pieces of registered device status information 1001a, 1001b, and 1001c correspond to the MFPs 101a, 101b, and 101c, respectively.

The identification information 1011 is identification information capable of uniquely identifying the MFP 101. The control unit 601 refers to the identification information 1011, thereby determining to which MFP 101 the registered device status information 1001 corresponds.

Communication information 1012 is information necessary to perform communication with the MFP 101. In this embodiment, the communication information 912 is the IP information of the MFP 101. The necessary information changes depending on the communication method to be used.

A display region 1013, the request situation 1014, and the notification situation 1015 are information necessary for the control unit 601 to decide the screen to be displayed on the operation/display unit 603.

When displaying the standby screen 800, the control unit 601 refers to the display region 1013 and determines which MFP 101 is assigned to each registered device display region 801. In addition, the control unit 601 refers to the request situation 1014 and the notification situation 1015, and sets the registered device display region 801 of the MFP 101 including an error to an error display. Additionally, when displaying the device status display screen 850, the control unit 601 refers to the request situation 1014 and the notification situation 1015, and changes the color of the error occurrence status display region 851 of the included error.

When the device status information 1000 is updated, the control unit 601 updates the display on the operation/display unit 603. When the request situation 1014 is referred to, and the registered device status information 1001 including an error exists, the screen transitions to the request screen 890. If the request situation 1014 does not include an error, the displayed screen is updated based on the device status information 1000 after the change.

<Flowchart of Control Unit 601 in Device Registration Processing>

Figure 11A:
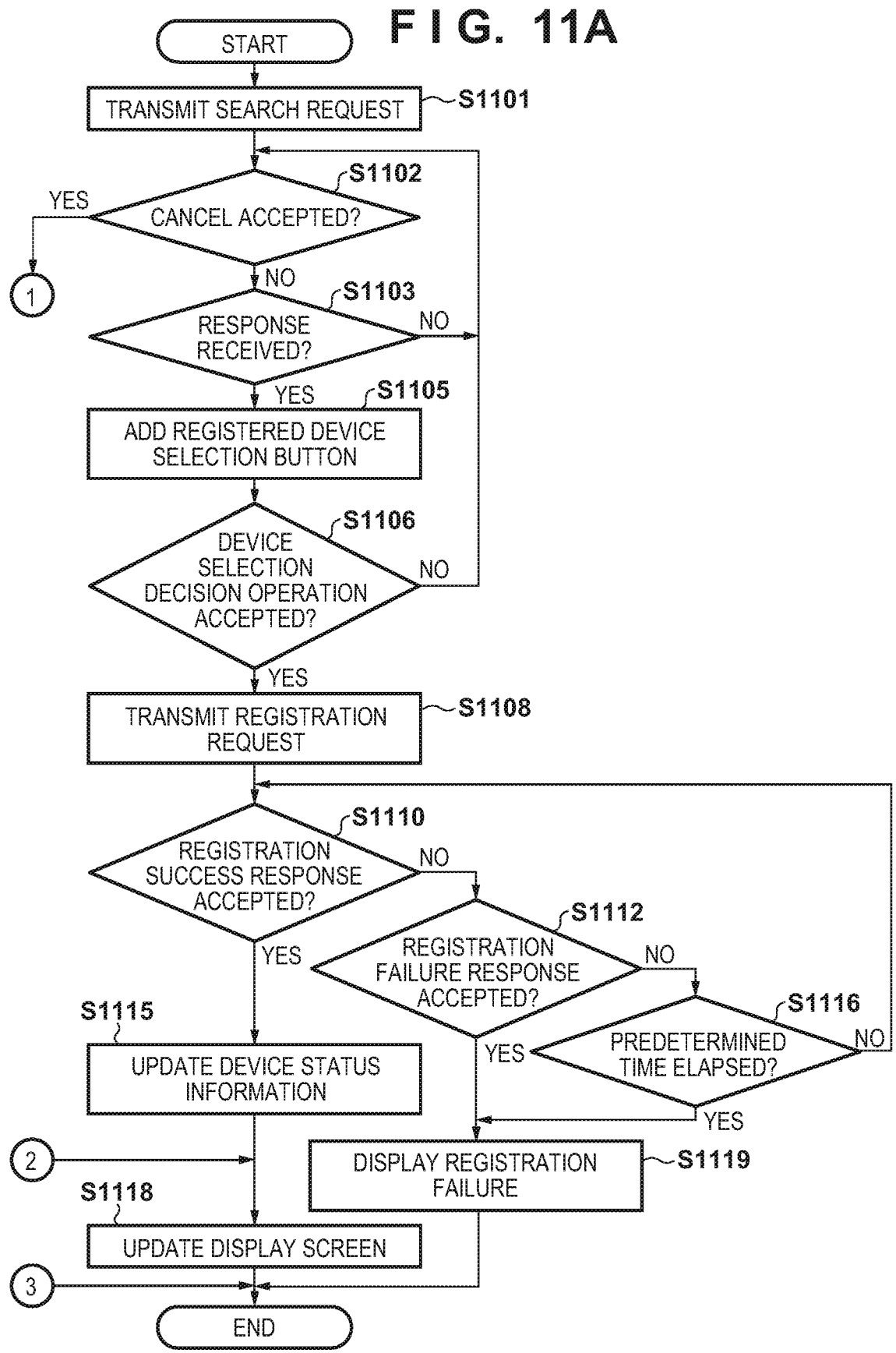
FIGS. 11A and 11B show a flowchart of a control unit 601 in device registration processing.
Figure 11B:
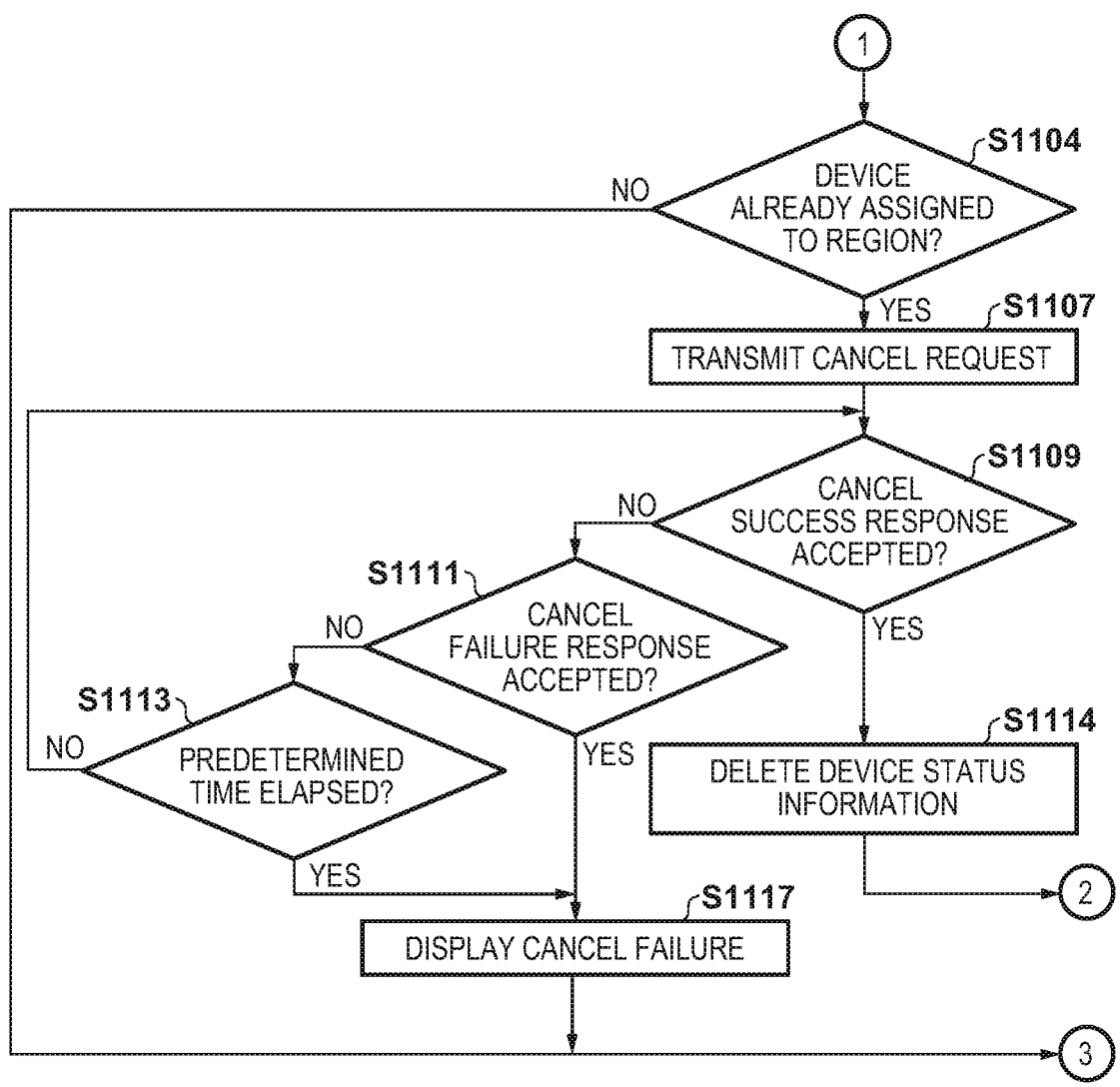

FIGS. 11A and 11B show a flowchart showing the procedure of processing of the control unit 601 of the mobile terminal 102 in device assignment processing for the registered device display region 801. The procedure starts when one of the registered device display regions 801 accepts a long-time pressing operation.

In step S1101, the control unit 601 broadcasts a search request to the MFPs 101 on the same network via the external OF 602. Here, broadcast using UDP is used. However, the method is not particularly limited. After the transmission, the process advances to step S1102.

In step S1102, the control unit 601 determines whether an operation of canceling device assignment is accepted. The operation of canceling device assignment is a swipe operation from left to right on the registered device selection screen 810. If cancel is accepted, the process advances to step S1104. If cancel is not accepted, the process advances to step S1103.

In step S1103, the control unit 601 determines whether a response to the transmitted search request is received from the MFP 101. If the response is received, the process advances to step S1105. If the response is not received, the process returns to step S1102.

In step S1104, the control unit 601 determines whether the MFP 101 is assigned to the registered device display region 801 that has accepted the long-time pressing operation first. If the MFP 101 is assigned, the process advances to step S1107. If the MFP 101 is not assigned, the procedure is ended.

In step S1105, the control unit 601 acquires the identification information and the communication information of the MFP 101 from the received response, and temporarily stores them in the RAM 605. The control unit 601 further adds the registered device selection button 811 corresponding to the registered device selection screen 810 shown in FIG. 8B. Here, the identification information of the device is the serial number of the MFP 101, and the communication information is the IP address of the MFP 101. When the registered device selection button 811 is added, the process advances to step S1106.

In step S1106, the control unit 601 determines whether a device selection decision operation is accepted. The device selection decision operation is a swipe operation from right to left at an arbitrary place of the screen in a state in which one of the registered device selection buttons 811 is in the selected state. If the device selection decision operation is accepted, the process advances to step S1108. If the device selection decision operation is not accepted, the process returns to step S1102.

In step S1107, the communication information 1012 in the registered device status information 1001 in which the identification information 1011 matches the identification information in the registered device selection button 811 whose selection is canceled is acquired from the device status information 1000 stored in the RAM 605, and a cancel request is transmitted via the external I/F 602. The cancel request includes the communication information and the identification information of the mobile terminal 102. After the transmission, the process advances to step S1109.

In step S1108, the communication information 1012 in the registered device status information 1001 in which the identification information 1011 matches the identification information in the registered device selection button 811 in the selected state is acquired from the device status information 1000 stored in the RAM 605, and a registration request is transmitted via the external I/F 602. The registration request includes the communication information and the identification information of the mobile terminal 102, the request priority assignment error type, and the operator status. After the transmission, the process advances to step S1110.

In step S1109, the control unit 601 determines whether a response representing a cancel success is accepted for the cancel request transmitted in step S1107. If the response representing a cancel success is accepted, the process advances to step S1114. If the response is not accepted, the process advances to step S1111.

In step S1110, the control unit 601 determines whether a response representing a registration success is accepted for the registration request transmitted in step S1108. If the response representing a registration success is accepted, the process advances to step S1115. If the response is not accepted, the process advances to step S1112.

In step S1111, the control unit 601 determines whether a response representing a cancel failure is accepted for the cancel request transmitted in step S1107. If the response representing a cancel failure is accepted, the process advances to step S1117. If the response is not accepted, the process advances to step S1113.

In step S1112, the control unit 601 determines whether a response representing a registration failure is accepted for the registration request transmitted in step S1108. If the response representing a registration failure is accepted, the process advances to step S1119. If the response is not accepted, the process advances to step S1116.

In step S1113, the control unit 601 determines whether a predetermined time has elapsed from the transmission of the cancel request. If the predetermined time has elapsed, the process advances to step S1117. If the predetermined time has not elapsed, the process returns to step S1109.

In step S1114, the control unit 601 deletes, from the device status information 1000 stored in the RAM 605, registered device status information in which the identification information 1011 matches the identification information of the device included in the cancel success response. After the deletion, the process advances to step S1118.

In step S1115, the control unit 601 registers the registered device status information of the MFP 101 in the device status information 1000 stored in the RAM 605. After the registration, the process advances to step S1118.

In step S1116, the control unit 601 determines whether a predetermined time has elapsed from the transmission of the registration request. If the predetermined time has elapsed, the process advances to step S1119. If the predetermined time has not elapsed, the process returns to step S1110.

In step S1117, the control unit 601 displays a cancel failure screen (not shown). After the display, the procedure is ended.

In step S1118, the control unit 601 updates the display on the operation/display unit 603 based on the device status information 1000 stored in the RAM 605. The screens to be displayed have been described with reference to FIGS. 8A to 8J. When the display is updated, the procedure is ended.

In step S1119, the control unit 601 displays a registration failure screen (not shown). After the display, the procedure is ended.

<Flowchart of Control Unit 201 upon Receiving Message from Mobile Terminal>

Figure 12B:
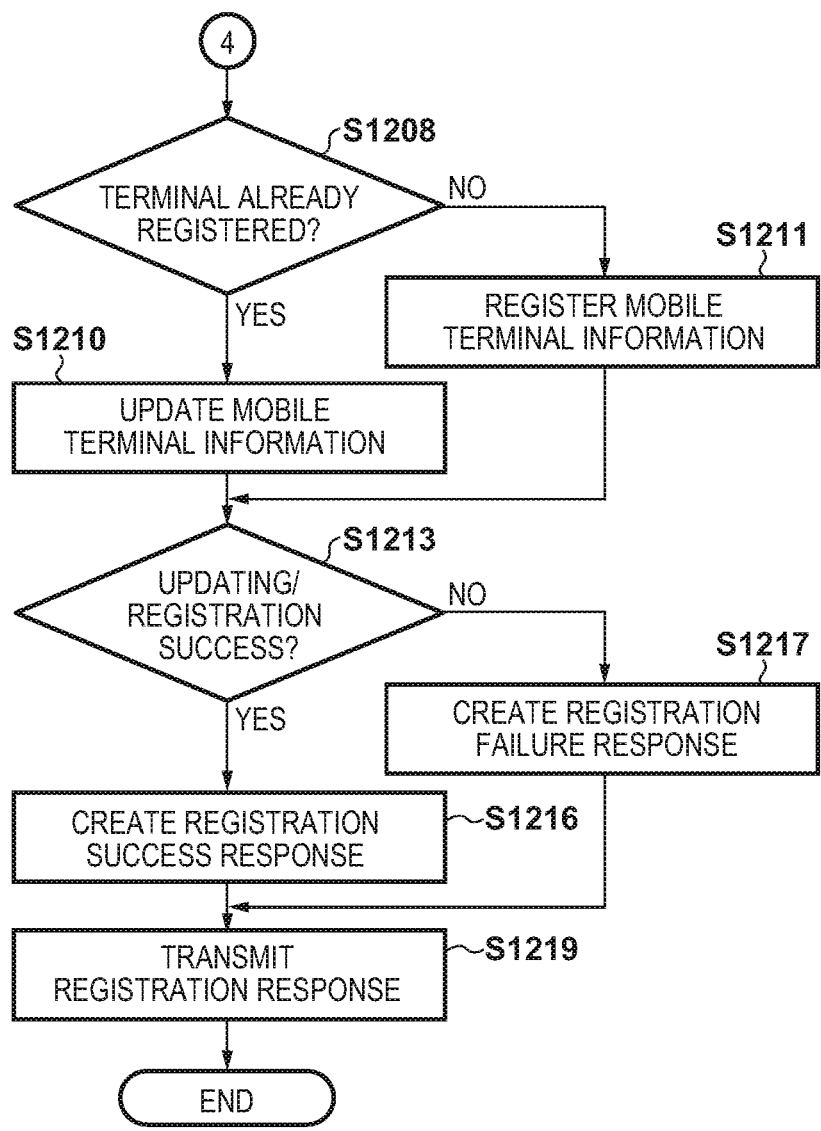

FIGS. 12A and 12B show a flowchart showing the procedure of processing of the control unit 201, which is performed when the MFP 101 accepts communication from the mobile terminal 102. The procedure starts when communication is received from the mobile terminal 102.

In step S1201, the control unit 201 determines whether the communication received from the mobile terminal 102 is a search request. The search request has been described concerning step S1101 in FIG. 11A. If the received communication is the search request, the process advances to step S1202. Otherwise, the process advances to step S1203.

In step S1202, the control unit 201 creates a response to the received search request. The response includes at least the identification information of the MFP 101 and the communication information used to perform communication. Here, the identification information is the serial number of the MFP, and the communication information is the IP address. When the response is created, the process advances to step S1204.

In step S1203, the control unit 201 determines whether the communication received from the mobile terminal 102 is a registration request. The registration request has been described concerning step S1108 in FIG. 11A. If the received communication is the registration request, the process advances to step S1208. Otherwise, the process advances to step S1205.

In step S1204, the control unit 201 transmits the response created for the search request in step S1202 to the mobile terminal 102. After the transmission, the procedure is ended.

In step S1205, the control unit 201 determines whether the communication received from the mobile terminal 102 is a cancel request. The cancel request has been described concerning step S1107 in FIG. 11A. If the received communication is the cancel request, the process advances to step S1209. Otherwise, the process advances to step S1206.

In step S1206, the control unit 201 determines whether the communication received from the mobile terminal 102 is an operator status change request. The operator status change request has been described with reference to FIG. 8G. If the received communication is the operator status change request, the process advances to step S1207. Otherwise, the procedure is ended.

In step S1207, the control unit 201 extracts the identification information of the mobile terminal and the operator status from the received operator status change request and updates the operator status 914 of the registered terminal information 901 in which the identification information 911 in the mobile terminal information 900 stored in the RAM 211 matches the identification information of the mobile terminal. After the updating, the procedure is ended.

In step S1208, the control unit 201 extracts the identification information of the mobile terminal from the received registration request, and determines whether the registered terminal information 901 in which the identification information 911 matches the identification information of the mobile terminal exists in the mobile terminal information 900 stored in the RAM 211. If the registered terminal information 901 exists, the process advances to step S1210. If the registered terminal information 901 does not exist, the process advances to step S1211.

In step S1209, the control unit 201 extracts the identification information of the mobile terminal from the received cancel request, and deletes, from the mobile terminal information 900 stored in the RAM 211, the registered terminal information 901 in which the identification information 911 matches the identification information of the mobile terminal. After the deletion, the process advances to step S1212.

In step S1210, the control unit 201 extracts the communication information of the mobile terminal 102, the request priority assignment error type, and the operator status from the received registration request, and updates the registered terminal information 901 in which the identification information 911 in the mobile terminal information 900 stored in the RAM 211 matches the identification information of the mobile terminal. After the updating, the process advances to step S1213.

In step S1211, the control unit 201 extracts the communication information of the mobile terminal 102, the request priority assignment error type, and the operator status from the received registration request, and adds the registered terminal information 901 to the mobile terminal information 900 stored in the RAM 211. After the addition, the process advances to step S1213.

In step S1212, the control unit 201 determines whether cancel of the mobile terminal 102 performed in step S1209 has succeeded. As for cancel failures, for example, a fault of access to the HDD 212 or the RAM 211, corruption of the cancel request received in step S1203, restrictions provided for cancelable mobile terminals 102 from the viewpoint of security, security violations, and the like can be included in the failures. Here, if a cancel request for the mobile terminal 102 that is not registered is accepted, it is determined that the cancel has succeeded. If cancel of the mobile terminal 102 has succeeded, the process advances to step S1215. If cancel has failed, the process advances to step S1214.

In step S1213, the control unit 201 determines whether the updating or registration of the mobile terminal information 900 performed in step S1210 or S1211 has succeeded. If the updating or registration of the mobile terminal 102 has succeeded, the process advances to step S1216. If the updating or registration has failed, the process advances to step S1217.

In step S1214, the control unit 201 creates a cancel failure response. The response includes at least information representing that the cancel has failed as the result for the request. The response may also include the identification information and the communication information of the MFP 101. When the response is created, the process advances to step S1218.

In step S1215, the control unit 201 creates a cancel success response. The response includes at least information representing that the cancel has succeeded as the result for the request. The response may also include the identification information and the communication information of the MFP 101. When the response is created, the process advances to step S1218.

In step S1216, the control unit 201 creates a registration success response for the registration request. The response includes at least information representing that the registration has succeeded. The response may also include the identification information and the communication information of the MFP 101. When the response is created, the process advances to step S1219.

In step S1217, the control unit 201 creates a registration failure response for the registration request. The response includes at least information representing that the registration has failed. The response may also include the identification information and the communication information of the MFP 101. When the response is created, the process advances to step S1219.

In step S1218, the control unit 201 transmits the response created for the cancel request in step S1214 or S1215 to the mobile terminal 102. After the transmission, the procedure is ended.

In step S1219, the control unit 201 transmits the response created for the registration request in step S1216 or S1217 to the mobile terminal 102. After the transmission, the procedure is ended.

<Flowchart of Control Unit 201 at Time of Activation>

Figure 13:
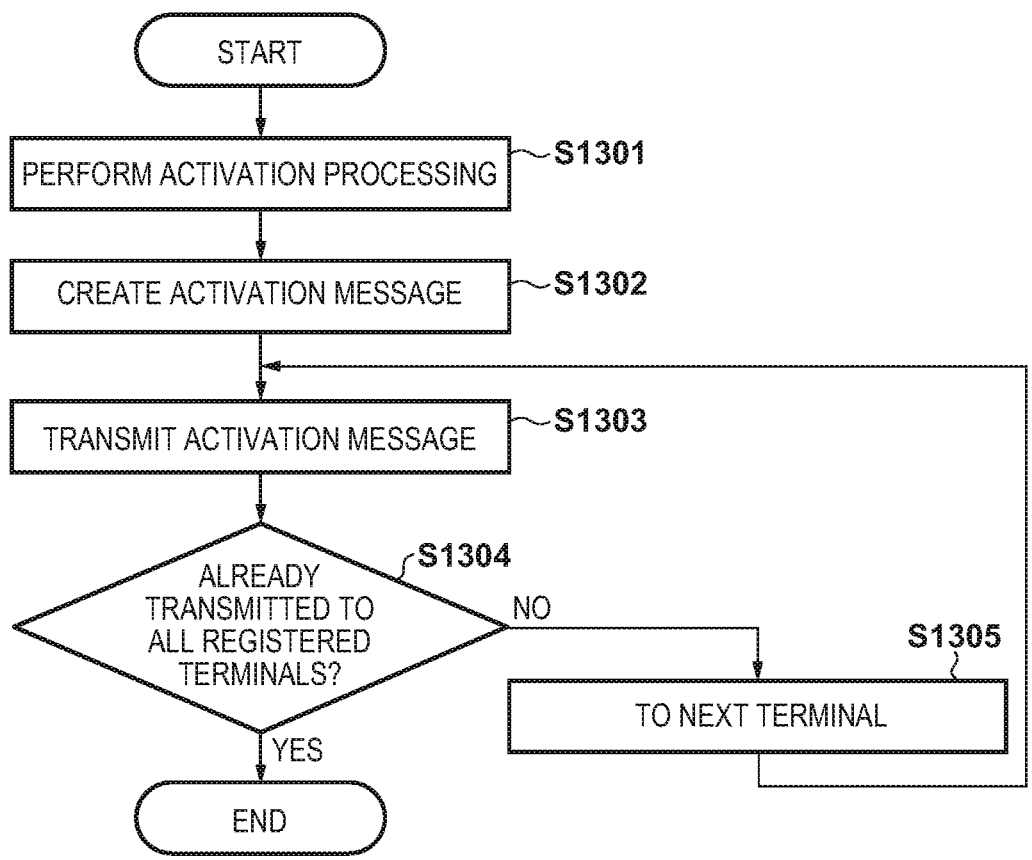
FIG. 13 is a flowchart of the control unit 201 at the time of activation of the MFP 101.

FIG. 13 is a flowchart showing the procedure of processing of the control unit 201, which is performed when communication with the mobile terminal 102 is performed at the time of activation of the MFP 101. The procedure starts when the MFP 101 accepts an activation instruction.

In step S1301, the control unit 201 performs activation processing. The activation processing is the same as normal processing, and a description thereof will be omitted. When the activation processing is performed, the process advances to step S1302.

In step S1302, the control unit 201 creates the activation message 1620. The activation message 1620 will be described with reference to FIG. 16C.

In step S1303, the control unit 201 transmits the activation message 1620 created in step S1302 to the mobile terminal 102. After the transmission, the process advances to step S1304.

In step S1304, the control unit 201 determines whether the message is transmitted to all the mobile terminals 102 registered in the mobile terminal information 900 stored in the RAM 211. If the message is transmitted to all the mobile terminals 102, the procedure is ended. If the message is not transmitted to all the mobile terminals 102, the process advances to step S1305.

In step S1305, the control unit 201 switches the message transmission target to the mobile terminal 102 to which the message is untransmitted. After the switching, the process returns to step S1303.

<Flowchart of Control Unit 201 upon Accepting Print Job>

Figure 14A:
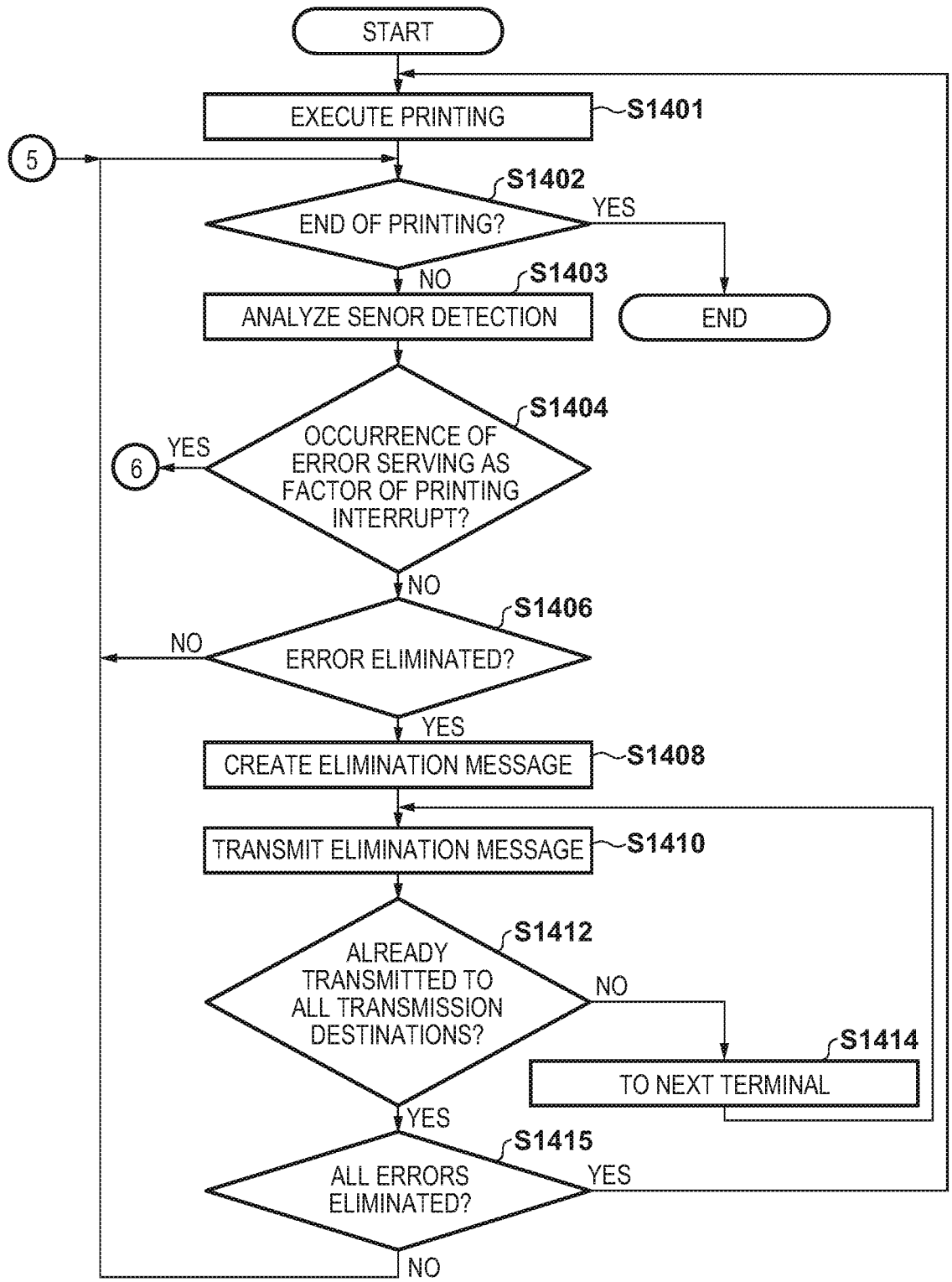
FIGS. 14A and 14B show a flowchart of the control unit 201 at the time of print job acceptance.
Figure 14B:
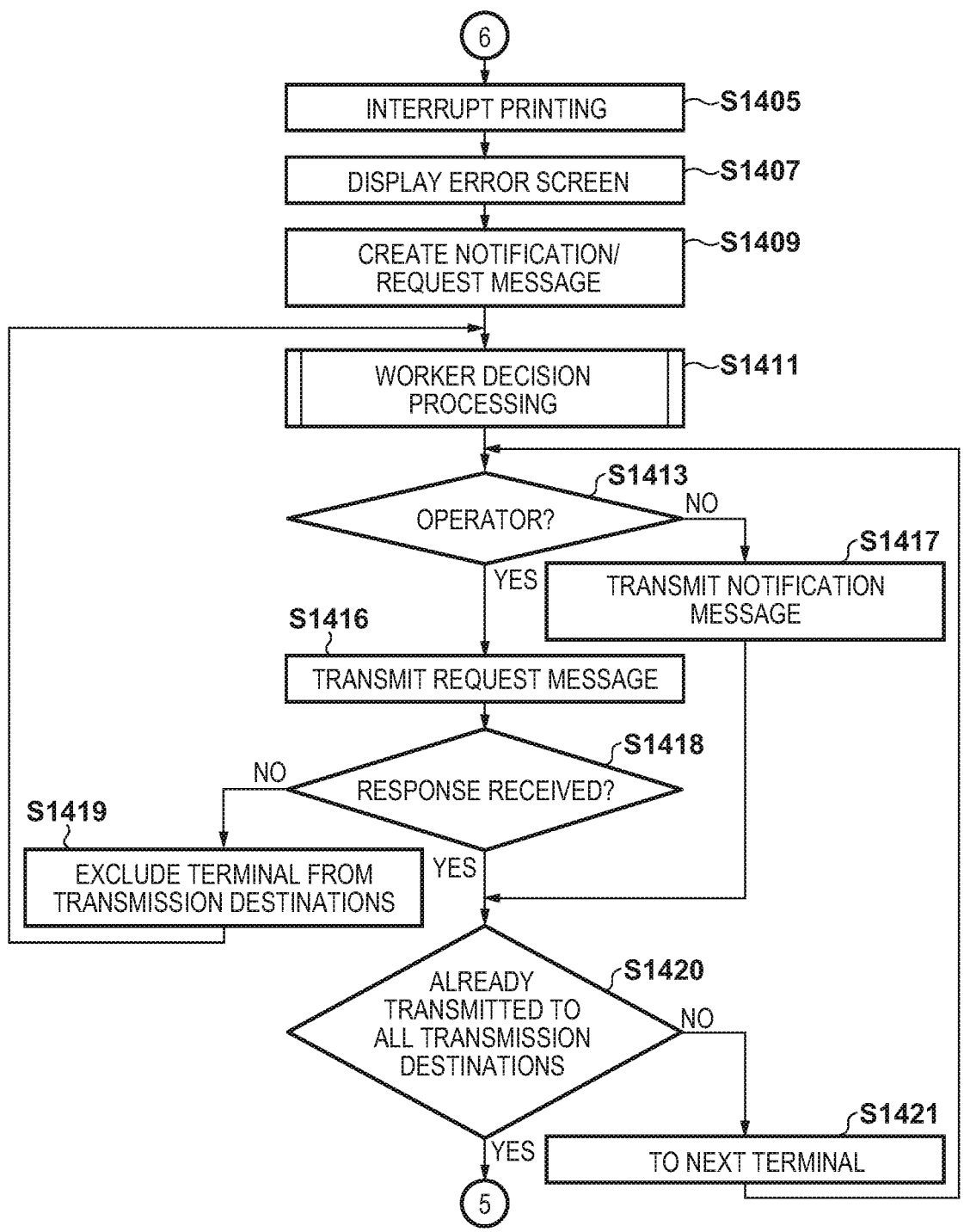

FIGS. 14A and 14B show a flowchart showing the procedure of processing of the control unit 201, which is performed when the MFP 101 accepts a print job. The procedure starts when a copy job is accepted from the operation/display unit 202 or when a print job is accepted via the external I/F 215.

In step S1401, the control unit 201 starts the accepted print job. This processing is the same as normal processing of starting a print job, and a detailed description thereof will be omitted. When the print job is started, the process advances to step S1402.

In step S1402, the control unit 201 determines whether the print job is ended. This includes not only a case in which the printing is completed up to the end but also a case in which cancel is accepted from the operation/display unit 202 or the like. If the print job is ended, the procedure is ended. If the print job is not ended, the process advances to step S1403.

In step S1403, the control unit 201 analyzes detection accepted from each of the stacked sheet sensor 206, the paper passage sensor 207, the toner remaining amount sensor 209, and the supply sheet sensor 214. Detection by the sensors has been described with reference to FIGS. 3, 4, and 5. After the analysis, the process advances to step S1404.

In step S1404, the control unit 201 determines whether the sensor detection analyzed in step S1403 represents the occurrence of an error as a cause of a printing interrupt. Errors that cause a printing interrupt include a paper jam, a paper shortage, a toner shortage (color material shortage), a discharge tray full, and a service call. If the sensor detection represents the occurrence of an error as a cause of a printing interrupt, the error is stored in the RAM 211, and the process advances to step S1405. Otherwise, the process advances to step S1406.

In step S1405, the control unit 201 interrupts execution of the print job. After the interrupt, the process advances to step S1407.

In step S1406, the control unit 201 determines whether the sensor detection analyzed in step S1403 represents an error elimination. If the sensor detection represents an error elimination, the eliminated error is deleted from the RAM 211, and the process advances to step S1408. Otherwise, the process returns to step S1402.

Figure 17A:
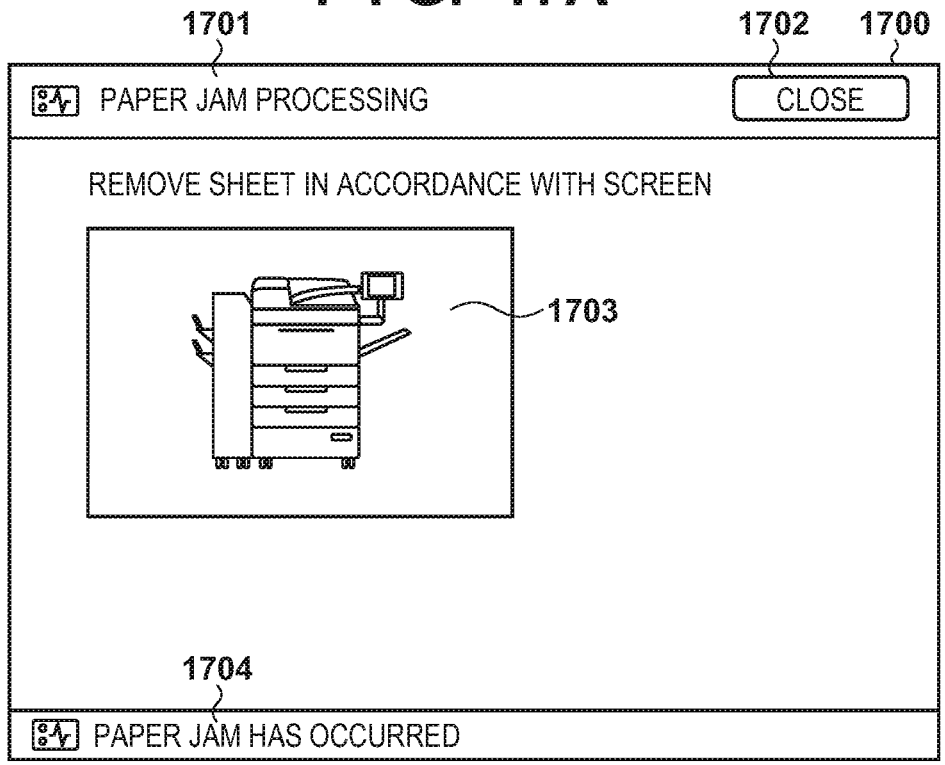
FIGS. 17A and 17B are schematic views of screens displayed on an operation/display unit 202.

In step S1407, the control unit 201 displays, on the operation/display unit 202, an error screen corresponding to the error that has occurred. FIG. 17A shows an example in a case of a paper jam. When the error screen is displayed, the process advances to step S1409.

In step S1408, the control unit 201 creates the elimination message 1630. The elimination message 1630 will be described with reference to FIG. 16D. When the elimination message 1630 is created, the process advances to step S1410.

In step S1409, the control unit 201 creates the request message 1600 and the notification message 1610. The request message 1600 and the notification message 1610 will be described with reference to FIGS. 16A and 16B, respectively. When the message is created, the process advances to step S1411.

In step S1410, the control unit 201 transmits the elimination message 1630 to the mobile terminal 102 of the transmission destination. After the transmission, the process advances to step S1412.

In step S1411, the control unit 201 performs worker decision processing. The worker decision processing will be described with reference to FIG. 15. When the worker is decided, the process advances to step S1413.

In step S1412, the control unit 201 determines whether the elimination message 1630 is transmitted to all transmission targets registered in the mobile terminal information 900 in the RAM 211. If the elimination message 1630 is transmitted to all transmission targets, the procedure is ended. If the elimination message 1630 is not transmitted to all transmission targets, the process advances to step S1414.

In step S1413, the control unit 201 determines whether the mobile terminal 102 of the transmission destination is the mobile terminal 102 decided as the worker in the worker decision processing of step S1411. If the mobile terminal 102 is the worker, the process advances to step S1416. Otherwise, the process advances to step S1417.

In step S1414, the control unit 201 switches the next transmission destination to a transmission target to which the message is untransmitted. After the switching, the process returns to step S1410.

In step S1415, the control unit 201 refers to the errors stored in the RAM 211, and determines whether all errors are eliminated. If all errors are eliminated, the process returns to step S1401. If an uneliminated error exists, the process returns to step S1402.

In step S1416, the control unit 201 transmits the request message 1600 to the mobile terminal of the transmission destination. After the transmission, the process advances to step S1418.

In step S1417, the control unit 201 transmits the notification message 1610 to the mobile terminal of the transmission destination. After the transmission, the process advances to step S1420.

In step S1418, the control unit 201 determines whether a response is received from the mobile terminal 102 for the request message 1600 transmitted in step S1416. If the transmission of the request message 1600 has failed, or if the response is not received within a predetermined time, the process advances to step S1419. If the response is received, the process advances to step S1420.

In step S1419, the control unit 201 excludes the mobile terminal of the transmission destination from the transmission targets. After the exclusion, the process returns to step S1411 to redo the worker decision processing.

In step S1420, the control unit 201 determines whether the message is transmitted to all transmission targets. If the message is transmitted to all transmission targets, the process advances to step S1402. If the message is not transmitted to all transmission targets, the process advances to step S1421.

In step S1421, the control unit 201 switches the next transmission destination to a transmission target to which the message is untransmitted. After the switching, the process returns to step S1413.

<Flowchart of Control Unit 201 in Worker Decision Processing>

FIG. 15 is a flowchart showing the procedure of processing of the control unit 201 in the worker decision processing of step S1411.

In step S1501, the control unit 201 determines whether a transmission target exists. Transmission targets are mobile terminals registered in the mobile terminal information 900 stored in the RAM 211 except those excluded in step S1419. If a transmission target exists, the process advances to step S1502. If no transmission target exists, the process advances to step S1504.

In step S1502, the control unit 201 refers to the operator status 914 of the mobile terminal information 900 stored in the RAM 211, and determines whether there is a transmission target for which the value is Available. If a transmission target that satisfies the condition exists, the process advances to step S1503. If such a transmission target does not exist, the process advances to step S1507.

In step S1503, the control unit 201 refers to the request priority assignment error type 913 of the mobile terminal information 900, and determines whether a transmission target for which the request priority assignment error type 913 includes the error that has occurred exists among the transmission targets that satisfy the condition of step S1502. If a mobile terminal that satisfies the condition exists, the process advances to step S1506. If such a mobile terminal does not exist, the process advances to step S1505.

Figure 17B:
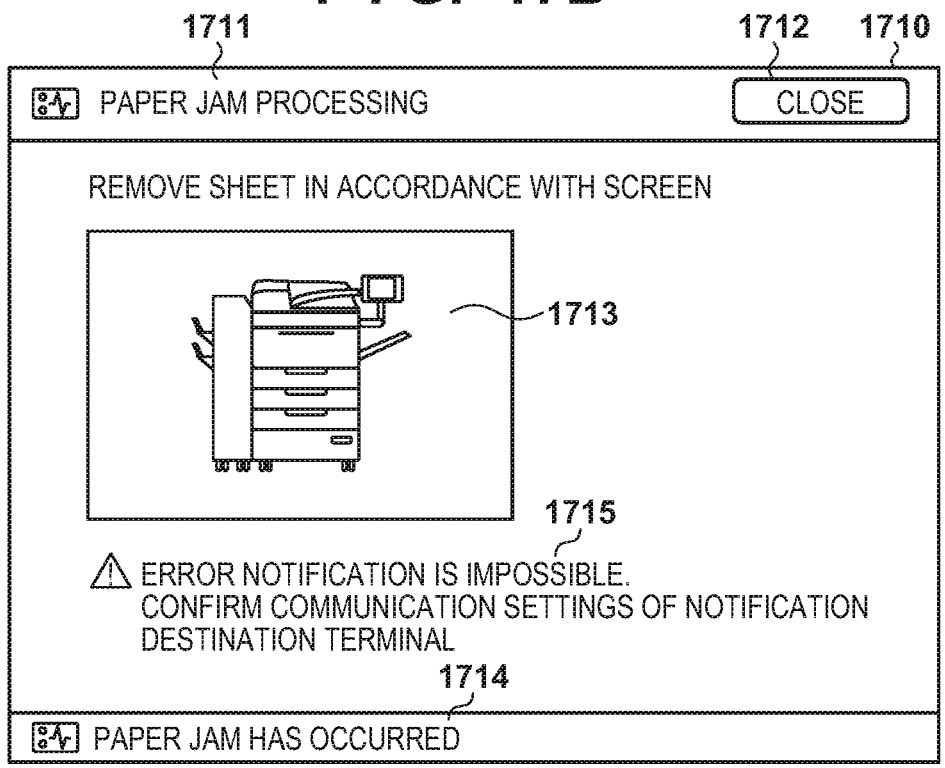

In step S1504, the control unit 201 displays a notification terminal confirmation request screen 1710 shown in FIG. 17B on the operation/display unit 202. When the notification terminal confirmation request screen 1710 is displayed, the procedure is ended.

In step S1505, the control unit 201 decides a worker from the transmission targets that satisfy the condition of step S1502. In this embodiment, the worker is decided at random. After the decision, the procedure is ended.

In step S1506, the control unit 201 decides a worker from the transmission targets that satisfy the condition of step S1503. In this embodiment, the worker is decided at random. After the decision, the procedure is ended.

In step S1507, the control unit 201 decides a worker from all transmission targets. In this embodiment, the worker is decided at random. After the decision, the procedure is ended.

<Description of Messages>

FIGS. 16A to 16D are views for explaining messages transmitted from the MFP 101 to the mobile terminal 102. FIG. 16A shows the request message 1600, FIG. 16B shows the notification message 1610, FIG. 16C shows the activation message 1620, and FIG. 16D shows the elimination message 1630.

The identification number 1601 stores information used to identify the MFP 101 that transmits the message. This is a value unique to each MFP 101, and is a value corresponding to the identification information 1011 in the device status information 1000. FIGS. 16A to 16D show an example in which the MFP 101b transmits each message.

A message type 1602 stores the type of a message. This is a value unique to each message type, and takes a value "Request" in the request message 1600, a value "Notification" in the notification message 1610, a value "StartUp" in the activation message 1620, and a value "Clear" in the elimination message 1630.

The error type 1603 stores the type of an error that occurs or is eliminated. This is a value unique to each error, and is a value corresponding to the request priority assignment error type 913 in the mobile terminal information 900 or the request situation 1014 or the notification situation 1015 in the device status information 1000. FIGS. 16A to 16D show an example in which a paper jam occurs and is eliminated.

As indicated by the example shown in FIGS. 16A to 16D, each of the request message 1600, the notification message 1610, and the elimination message 1630 includes the identification number 1601, the message type 1602, and the error type 1603, and the activation message 1620 includes the identification number 1601 and the message type 1602. Note that the messages may have a value that is not included here. For example, it is also possible to cause the message to have information representing a location where a paper jam has occurred or the type of paper for which a paper shortage has occurred and display the information on the operation/display unit 603 of the mobile terminal 102.

<Description of Images Displayed on Operation/Display Unit 202>

FIGS. 17A and 17B are schematic views of screens displayed on the operation/display unit 202 of the MFP 101 in the image forming system according to this embodiment. FIG. 17A shows a paper jam occurrence screen 1700. FIG. 17B shows the notification terminal confirmation request screen 1710. If detection of the passage of a sheet is not received within a predetermined time from the paper passage sensor 207 arranged on the conveyance path 350 of the sheet, or if detection of the sheet is continuously received, the control unit 201 determines that a paper jam has occurred. Note that in this embodiment, the paper jam will be described as an example of the error to be notified. However, this also applies to other errors.

When the control unit 201 determines the occurrence of a paper jam during a print job or a copy job, the paper jam occurrence screen 1700 shown in FIG. 17A is displayed. The paper jam occurrence screen 1700 is a screen configured to show that printing is interrupted due to a paper jam and show an operation procedure for eliminating the paper jam.

An error type display region 1701 is a region showing information used to identify the type of the error that has occurred. Identification information such an error name or an error number is displayed.

A close button 1702 is a button used to end the paper jam occurrence screen 1700. When an instruction to the close button 1702 is accepted, the paper jam occurrence screen 1700 is ended, and the screen transitions to the screen displayed before the transition to the paper jam occurrence screen 1700. When the paper jam occurrence screen 1700 is ended by selecting the close button 1702, the paper jam is not eliminated, and therefore, printing is not resumed.

An error elimination procedure display region 1703 is a region configured to display a procedure of eliminating the error that has occurred. The display is done using a moving image or an animation such that the procedure can be understood well.

A device status display region 1704 is a display region configured to display the status of the MFP 101. Information concerning the error that has occurred or the job under execution is displayed. The device status display region 1704 is a region commonly displayed in all screens. Hence, even when the paper jam occurrence screen 1700 is ended by the close button 1702, the error that has occurred can always be known. Since only pieces of limited information can be displayed simultaneously in the device status display region 1704, important information is preferentially displayed. Hence, when an error as a cause of an interrupt of a job occurs, the error is preferentially displayed. When detection of the paper passage sensor 207 is analyzed, and the control unit 201 determines the elimination of the paper jam, the operation/display unit 202 is instructed to end the paper jam occurrence screen 1700. At the same time, the error information displayed in the device status display region 1704 is erased, and display of information of the next highest priority is instructed.

In step S1504 of FIG. 15, the notification terminal confirmation request screen 1710 shown in FIG. 17B is displayed. The notification terminal confirmation request screen 1710 is a screen configured to additionally display a notification destination terminal communication error display region 1715 on the paper jam occurrence screen 1700 to display the occurrence of the paper jam and simultaneously request to confirm the communication status of the mobile terminal 102 of the error notification destination.

An error type display region 1711, a close button 1712, an error elimination procedure display region 1713, and a device status display region 1714 are the same as the error type display region 1701, the close button 1702, the error elimination procedure display region 1703, and the device status display region 1704 shown in FIG. 17A, respectively.

The notification destination terminal communication error display region 1715 is a display region configured to display that the request message 1600 at the time of an error occurrence could not be transmitted to any mobile terminal. In a state in which the action message 1600 for an error cannot be sent to any terminal, the action for the error may not be taken for a long time, and the error needs to be eliminated immediately. The notification destination terminal communication error display region 1715 is a region used to notify the operator of this state. Note that in FIG. 17B, the paper jam occurrence of high display priority is displayed in the device status display region 1714. When the paper jam is eliminated, the notification destination terminal communication error is displayed. The notification destination terminal communication error displayed in the notification destination terminal communication error display region 1715 and the device status display region 1714 can be eliminated by executing device registration processing from the mobile terminal 102 to the MFP 101 again.

<Flowchart of Control Unit 601 at Time of Message Reception>

Figure 18:
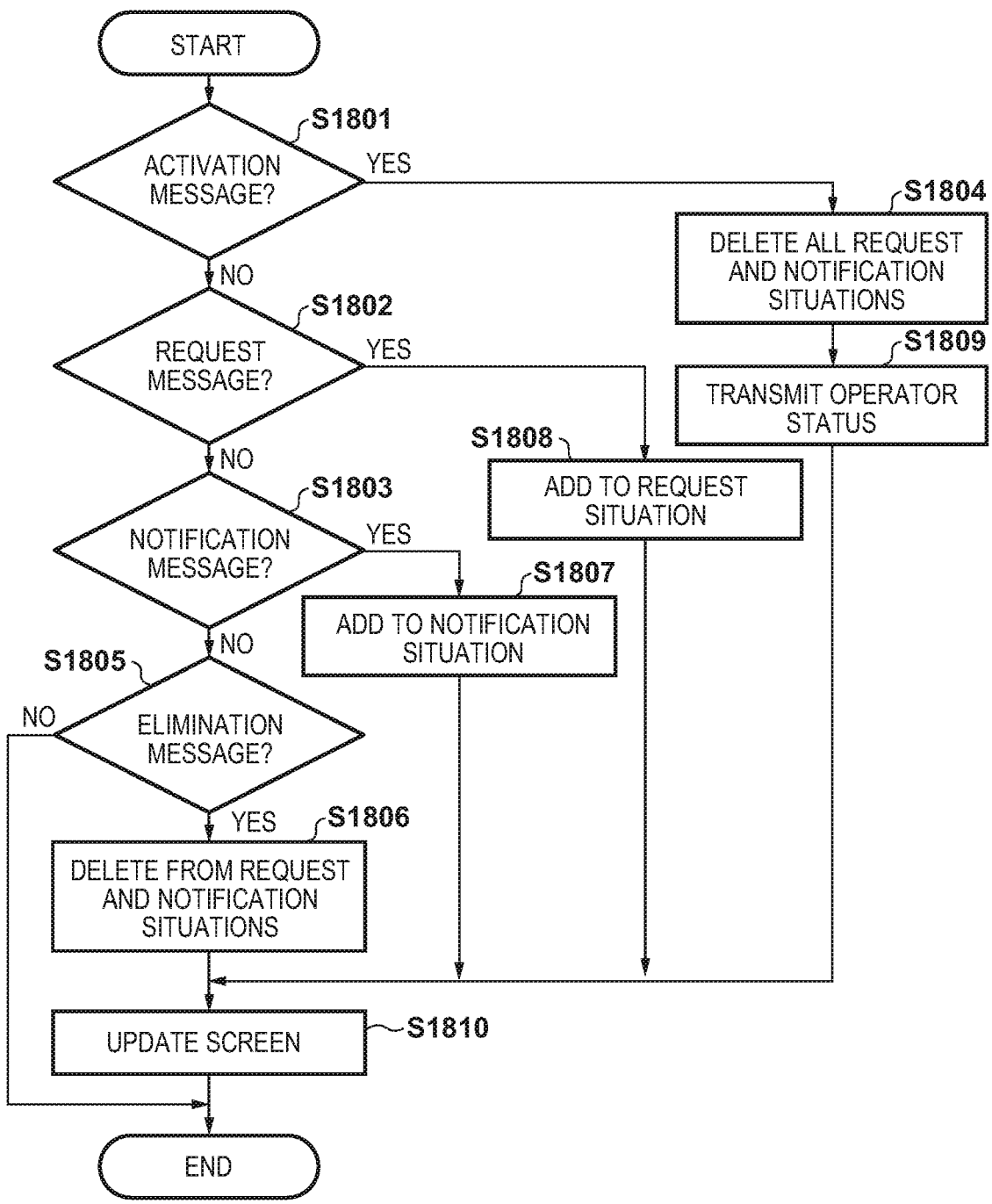
FIG. 18 is a flowchart of the control unit 601 at the time of message reception.

FIG. 18 is a flowchart showing the procedure of processing of the control unit 601, which is performed when the mobile terminal 102 accepts communication from the MFP 101 via the external I/F 602. The procedure starts when communication is received from the MFP 101.

In step S1801, the control unit 601 refers to the message type 1602 of the accepted message, and determines whether the accepted message is the activation message 1620. If the accepted message is the activation message 1620, the process advances to step S1804. Otherwise, the process advances to step S1802.

In step S1802, the control unit 601 refers to the message type 1602 of the accepted message, and determines whether the message is the request message 1600. If the accepted message is the request message 1600, the process advances to step S1808. Otherwise, the process advances to step S1803.

In step S1803, the control unit 601 refers to the message type 1602 of the accepted message, and determines whether the message is the notification message 1610. If the accepted message is the notification message 1610, the process advances to step S1807. Otherwise, the process advances to step S1805.

In step S1804, the control unit 601 extracts the identification information 1601 from the activation message 1620, and deletes all errors in the request situation 1014 and the notification situation 1015 of the registered device status information 1001 whose identification information matches the identification information 1011 in the device status information 1000 stored in the RAM 605. After the deletion, the process advances to step S1809.

In step S1805, the control unit 601 refers to the message type 1602 of the accepted message, and determines whether the message is the elimination message 1630. If the accepted message is the elimination message 1630, the process advances to step S1806. Otherwise, the procedure is ended.

In step S1806, the control unit 601 extracts the identification information 1601 and the error type 1603 from the elimination message 1630, and deletes an error that matches the error type 1603 in errors included in the request situation 1014 and the notification situation 1015 of the registered device status information 1001 whose identification information matches the identification information 1011 in the device status information 1000 stored in the RAM 605. After the deletion, the process advances to step S1810.

In step S1807, the control unit 601 extracts the identification information 1601 and the error type 1603 from the notification message 1610, and adds the error of error type 1603 to the notification situation 1015 of the registered device status information 1001 whose identification information matches the identification information 1011 in the device status information 1000 stored in the RAM 605. After the addition, the process advances to step S1810.

In step S1808, the control unit 601 extracts the identification information 1601 and the error type 1603 from the request message 1600, and adds the error of error type 1603 to the request situation 1014 of the registered device status information 1001 whose identification information matches the identification information 1011 in the device status information 1000 stored in the RAM 605. After the addition, the process advances to step S1810.

In step S1809, the control unit 601 refers to the communication information 1012 of the registered device status information 1001 for which the identification information 1601 of the activation message 1620 matches the identification information 1011 in the device status information 1000 stored in the RAM 605, and transmits the operator status stored in the RAM 605 as an operator status change request.

In step S1810, the control unit 601 updates the display on the operation/display unit 603 based on the updated device status information 1000. The updated screen has been described with reference to FIGS. 8A to 8J.

As described above, the printing apparatus implemented in this embodiment decides an operator who can appropriately take an action for an error that has occurred based on the status of each operator who carries the mobile terminal 102 and the information of the type of the error for which the operator preferentially takes an action, transmits an action request, and notifies the remaining operators of the occurrence of the error. In this way, in accordance with the occurrence of the error, the apparatus not only simply notifies each operator of the occurrence of the error but also transmits a request of an action for the error or a simple notification to the terminal of each operator by a method capable of identifying the operator. With this processing, according to the present invention, the operator who should take an action for the error becomes clear, and it is possible to prevent a cause of decreased efficiency of the printing operation when an error is neglected, or a plurality of operators set about the action. It is also possible to allow all operators to track the operation situation of the MFP 101.

Second Embodiment

In the first embodiment, each device is notified in advance whether an operator can perform a work so the action request is not notified. However, in some cases, notifying whether an operator can perform a work is forgotten, or it should be determined, in accordance with an individual action matter, whether an operator can take an action. The second embodiment aims at allowing an operator to select acceptance or denial when he/she receives an action request.

Details of the second embodiment will be described with reference to FIGS. 19A to 22.

<Sequence Chart at Time of Message Transmission>

Figure 19B:
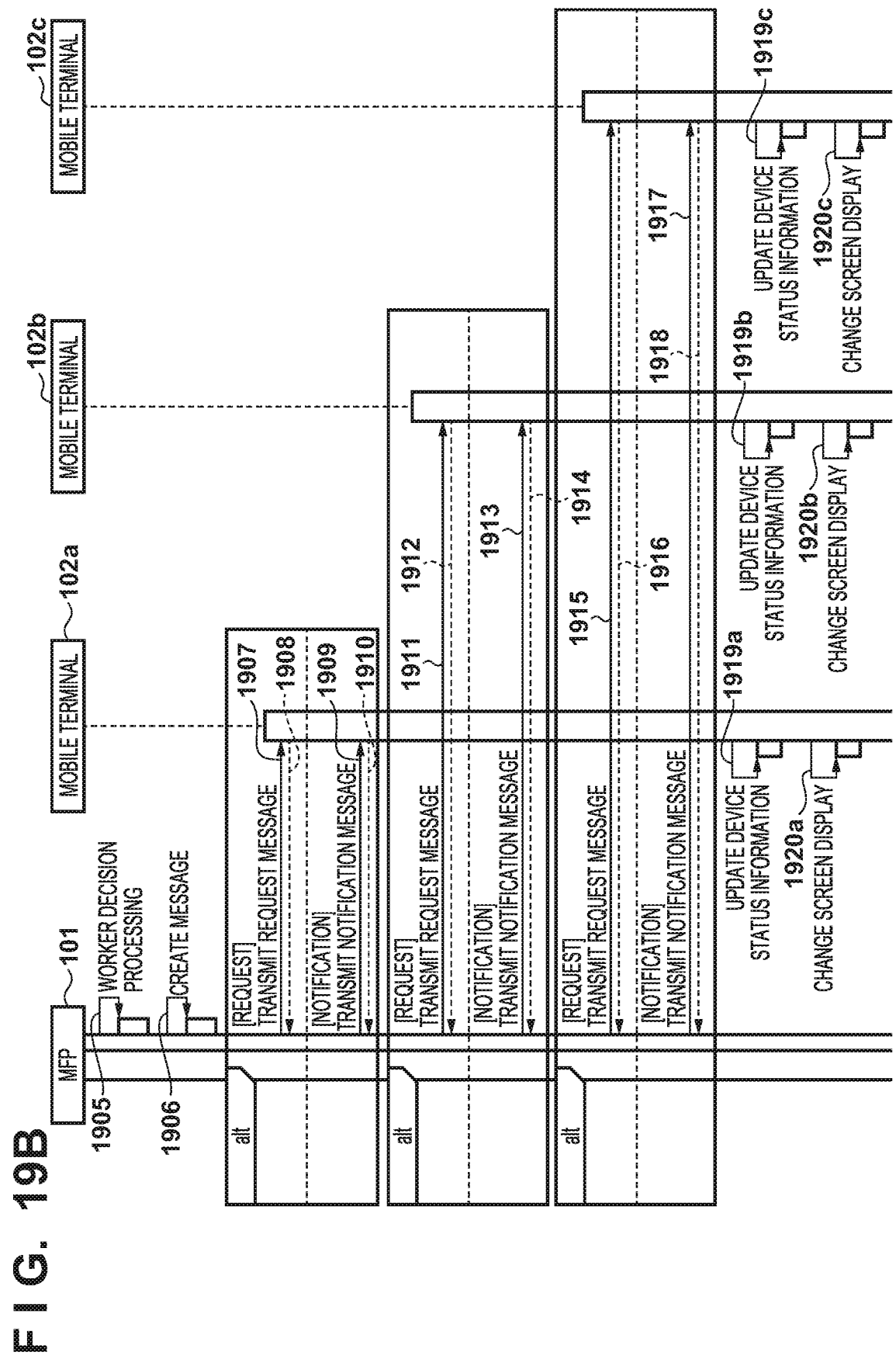
FIG. 19B is a sequence chart of the second embodiment.

FIGS. 19A to 19C are sequence charts according to the second embodiment, which replace FIGS. 7B and 7C. Activation processing is the same as in steps 701 to 714 in FIG. 7A, and a description thereof will be omitted.

Referring to FIG. 19A, steps 1901 and 1902 are the same as steps 720 and 721. Step 1903 is the same as step 733. For convenience of sequence chart, step 1903 is placed before message transmission processing 1904, but may be processed in parallel to message transmission processing. In step 1904, a control unit 201 starts message transmission processing.

After that, a step 19B of transmitting a request message or a notification message from an MFP 101 to a registered mobile terminal 102. FIG. 19B shows the step 19B. The step 19B includes steps 1905 to 1920. In step 1905, in step S1502 of the flowchart of the control unit 201 in the worker decision processing described with reference to FIG. 15, the control unit 201 refers to an operator status 914 according to the first embodiment and searches for the mobile terminal 102 for which the value is Available (capable of performing a work) and is not Deny (denial). Here, the operator status 914 in management information 900 of the mobile terminal shown in FIG. 9 has the value Available (capable of performing a work) or Busy (busy) in the first embodiment. In this embodiment, however, in a case of Available (capable of performing a work), a value representing it is Deny (denial) or not is further provided. That is, in this embodiment, the value of the operator status 914 is one of the three values Busy, Available, and Available+Deny. A new field indicating Deny may be added, as a matter of course. The value Deny is a value set when a denial response is received for the mobile terminal of the request destination, as will be described later, and step 1906 is the same as step 724.

In steps 1907 to 1918, the control unit 201 transmits the request message to the mobile terminal 102 decided as the worker in the worker decision processing of step 1905 (FIG. 15), and transmits the notification message to the remaining mobile terminals. The message transmission processing is the same as in steps 725 to 730.

Figures 20, 21:
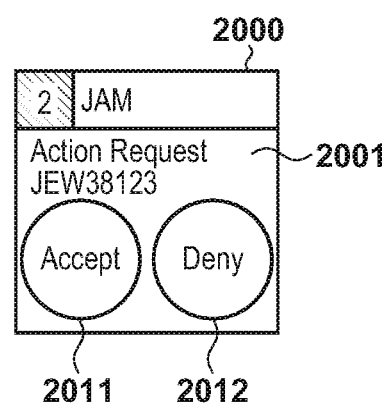
FIG. 20 is a view showing an example of the screen of a mobile terminal 102 that has received a request message according to the second embodiment.
FIG. 21 is a view showing an example of an acceptance message according to the second embodiment.

Step 1919 is the same as step 731. In step 1920, the processing of the mobile terminal 102 that has received the notification message is the same as in step 732. On the other hand, each mobile terminal 102 that has received the request message displays a screen 2000 including buttons capable of accepting or denying the request as shown in FIG. 20 in place of the request screen 890, unlike the first embodiment. An action request message 2001 shown in FIG. 20 is the same as the action request message 891. However, since the screen 2000 includes the buttons, there is no sufficient space to display details. For this reason, details are displayed by tapping a place other than the buttons or performing a swipe operation from below to above. An accept button 2011 is a button used to transmit, in step 1921, 1923, or 1925, an acceptance response to the received request message in step 1907, 1911, or 1915. A deny button 2012 is a button used to transmit, in step 1922, 1924, or 1926, a denial response to the received request message in step 1907, 1911, or 1915.

After that, a step 19C of transmitting an acceptance message or a denial message from the mobile terminal 102 that has received the message to the MFP 101 is performed. FIG. 19C shows the step 19C. The step 19C includes steps 1921 to 1927. In steps 1921 to 1926, a control unit 601 of the mobile terminal 102 that has received the request message in step 1907, 1911, or 1915 transmits the acceptance message when the accept button 2011 is pressed or transmits the denial message when the deny button 2012 is pressed. FIG. 21 shows an example of an acceptance message 2200. Identification information 2201 stores information used to identify the mobile terminal 102 that transmits the acceptance message. This is a value unique to each mobile terminal 102. In a case of the acceptance message, a message type 2202 is Accept representing acceptance. If it is the denial message, Deny representing denial is stored. When the accept button 2011 is pressed, Accept is stored. When the deny button 2012 is pressed, Deny is stored. An error type 2203 is used to store an error for which an action request is received.

In step 1927, the control unit 201 updates a denial situation 2116 by the message received in steps 1921 to 1926. In a case in which Accept is received, the denial situation is cleared. That is, the operator status 914 is set to Available. In a case in which Deny is received, Available+Deny is set to the operator status 914 of the corresponding mobile terminal. Here, the mobile terminal 102 whose operator status 914 is set to Available+Deny is excluded from the request message targets in step 1905.

Message transmission processing 1904 in steps 1905 to 1927 is repetitively executed until an acceptance from one of the mobile terminals 102 is received.

Steps 1928 to 1938 are the same as steps 740 to 750.

As described above, when the operator can notify acceptance or denial in correspondence with each action request, it is possible to forget notifying whether an operator can perform a work or determine, in accordance with an individual action matter, whether an operator can take an action.

In addition, in steps 1921 to 1926, if a predetermined time has elapsed, a case in which a response cannot be returned to a request is assumed, and the control unit 601 of the mobile terminal 102 may transmit the denial message. Alternatively, without receiving a message from the mobile terminal 102, timeout may be determined as a denial on the side of the control unit 201 of the device.

Additionally, if the denial message is received from all the mobile terminals 102 in step 1927, a message representing that all operators have denied may be transmitted to all the mobile terminals 102.

Additionally, if the denial message is received from all the mobile terminals 102 in step 1927, a re-request may be transmitted from the mobile terminal 102 to which the request has been transmitted first.

The mobile terminal 102 may be notified of not the request message 1909, 1913, or 1917 but only the request message 1907, 1911, or 1915.

Additionally, in the first and second embodiments, the action request message is transmitted to only one terminal device in correspondence with one error. However, the action request message may be transmitted to a plurality of terminal devices.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-098059 filed May 22, 2018, which is hereby incorporated by reference herein in its entirety.

What is claimed is:

1. An image forming system in which an image forming apparatus and a plurality of portable terminals are connected via wireless communication,
   wherein the image forming apparatus comprises:
   an image forming unit configured to form an image on a sheet;
   a detector configured to detect an error as a cause of an interrupt of image formation by the image forming unit; and
   one or more processors functioning as a transmission control unit configured to, when the error is detected by the detector, specify a portable terminal, through which an operation to eliminate the error is requested, among the plurality of portable terminals, transmit a request message to request the operation to eliminate the error to the specified portable terminal, and transmit a notification message that notifies of an occurrence of the error to each portable terminal other than the specified portable terminal among the plurality of portable terminals,
   wherein if the transmission control unit fails in transmitting the request message, a portable terminal as a transmission destination of the request message is selected from among the plurality of portable terminals except the portable terminal for which the transmission has failed,
   each of the plurality of portable terminals comprises a user interface unit,
   the portable terminal that has received the request message displays, on the user interface unit, information representing a type of the error and information that promotes an elimination of the error, and
   the portable terminal that has received the notification message displays, on the user interface unit, not the information that promotes the elimination of the error but the information representing the type of the error.

2. An image forming apparatus connected to a plurality of portable terminals via wireless communication, comprising:
   an image forming unit configured to form an image on a sheet;
   a detector configured to detect an error as a cause of an interrupt of image formation by the image forming unit; and
   one or more processors configured to function as a transmission control unit configured to, when the error is detected by the detector, specify a portable terminal, through which an operation to eliminate the error is requested, among the plurality of portable terminals, transmit a request message to request the operation to eliminate the error to the specified portable terminal, and transmit a notification message that notifies of an occurrence of the error to each portable terminal other than the specified portable terminal among the plurality of portable terminals,
   wherein if the transmission control unit fails in transmitting the request message, a portable terminal as a transmission destination of the request message is selected from among the plurality of portable terminals except the portable terminal for which the transmission has failed.

3. The apparatus according to claim 2, wherein information concerning an error for which an action can be taken is received from the portable terminal, and the portable terminal requested to perform the operation is specified based on the received information concerning the error for which the action can be taken.

4. The apparatus according to claim 3, wherein the information concerning the error for which the action can be taken includes a type of an error for which an action is preferentially taken and an operator status representing that an operator associated with the portable terminal can take the action, and
   the transmission control unit transmits a message of an action request to the portable terminal for which the detected error corresponds to the type of the error for which the action is preferentially taken, and the operator status represents that the operator can take the action.

5. The apparatus according to claim 4, wherein if the transmission control unit fails in transmitting the request message to all the portable terminals for which the information concerning the error for which the action can be taken represents that the action can be taken for the detected error, a message representing that the transmission of the request message has failed is displayed by a display unit.

6. The apparatus according to claim 4, further comprising a reception unit configured to receive one of an acceptance response and a denial response to the request message from the portable terminal that is the transmission destination of the request message,
wherein if the denial response is received, the portable terminal as the transmission destination of the request message is selected from among the plurality of portable terminals except the portable terminal of the transmission destination of the denial response.

7. The apparatus according to claim 6, wherein if the transmission control unit fails in transmitting the request message to all the portable terminals for which the information concerning the error for which the action can be taken represents that the action can be taken for the detected error, or if the denial response is received, a message representing that the transmission of the request message has failed is displayed by a display unit.

8. The apparatus according to claim 2, wherein when the elimination of the error is detected, the transmission control unit transmits an elimination message representing that the error is eliminated to all the portable terminals.

9. The apparatus according to claim 2, wherein when the image forming apparatus is activated, all the portable terminals are notified of the activation of the image forming apparatus.

10. The apparatus according to claim 2, wherein the error includes a sheet shortage, a jam, a color material shortage, a discharge tray full, and a service call.

11. An error notification method in an image forming system in which an image forming apparatus including an image forming unit and a plurality of portable terminals are connected via wireless communication, the method comprising:
detecting, by the image forming apparatus, an error as a cause of an interrupt of image formation by the image forming unit;
when the error is detected by the image forming apparatus, specifying a portable terminal, through which an operation to eliminate the error is requested, among the plurality of portable terminals, transmitting a request message to request the operation to eliminate the error to the specified portable terminal, and transmitting a notification message that notifies of an occurrence of the error to each portable terminal other than the specified portable terminal among the plurality of portable terminals, wherein if the transmission of the request message has failed, a portable terminal as a transmission destination of the request message is selected from among the plurality of portable terminals except the portable terminal for which the transmission has failed;
displaying information representing a type of the error and information that promotes an elimination of the error on a user interface unit by the portable terminal that has received the request message; and
displaying not the information that promotes the elimination of the error but the information representing the type of the error on the user interface unit by the portable terminal that has received the notification message.

12. An error notification system for notifying a plurality of portable terminals of an error via a wireless communication in response to detection of an error as a cause of an interrupt of an image forming operation occurred in an image forming apparatus that forms an image on a sheet, the system comprising:
a transmitter configured to transmit, via the wireless communication, a request message for requesting an operation to eliminate the error and a notification message for notifying the occurrence of the error without requesting the operation to eliminate the error; and
a controller configured to determine a first portable terminal, to which the request message is transmitted, among the plurality of portable terminals,
wherein, when the error is detected, the controller controls the transmitter to:
transmit the request message to the first portable terminal, and
transmit the notification message to second portable terminals other than the first portable terminal among the plurality of portable terminals,
wherein in a case where the transmitter fails to transmit the request message to the first portable terminal, the controller determines a portable terminal, to which the request message is transmitted, from among the second portable terminals.

13. The system according to claim 12, wherein the error includes a sheet shortage.

14. The system according to claim 12, wherein the error includes a sheet jam.

15. The system according to claim 12, wherein the error includes a discharge tray full.

16. The system according to claim 12, wherein the transmitter receives one of an acceptance response and a denial response to the request message from the portable terminal that is the transmission destination of the request message.

17. The system according to claim 12, wherein the controller is configured to determine that the transmission of the request message fails in a case where the response from the first portable terminal is not received within a predetermined time.

18. An image forming apparatus connected to a plurality of portable terminals via wireless communication, comprising:
an image forming unit configured to form an image on a sheet;
a detector configured to detect an error as a cause of an interrupt of image formation by the image forming unit;
a transmitter configured to transmit, via the wireless communication, a request message for requesting an operation to eliminate the error and a notification message for notifying the occurrence of the error without requesting the operation to eliminate the error; and
a controller configured to determine a first portable terminal, to which the request message is transmitted, among the plurality of portable terminals,
wherein, when the error is detected by the detector, the controller controls the transmitter to:
transmit the request message to the first portable terminal, and
transmit the notification message to second portable terminals other than the first portable terminal among the plurality of portable terminals,
wherein in a case where the transmitter fails to transmit the request message to the first portable terminal, the controller is configured to determine a portable terminal, to which the request message is transmitted, from among the second portable terminals.

19. A server apparatus for receiving an error as a cause of an interrupt of an image forming operation occurred in an image forming apparatus that forms an image on a sheet, and transmitting a message to a plurality of portable terminals via a wireless communication in response to the reception of the error, the server apparatus comprising:
- a transmitter configured to transmit, via the wireless communication, a request message for requesting an operation to eliminate the error and a notification message for notifying the occurrence of the error without requesting the operation to eliminate the error; and
- a controller configured to determine a first portable terminal, to which the request message is transmitted, among the plurality of portable terminals,
- wherein, when the error is detected, the controller controls the transmitter to:
  - transmit the request message to the first portable terminal, and
  - transmit the notification message to second portable terminals other than the first portable terminal among the plurality of portable terminals,
- wherein in a case where the transmitter fails to transmit the request message to the first portable terminal, the controller is configured to determine a portable terminal, to which the request message is transmitted, from among the second portable terminals.

20. An error notification system for notifying a plurality of portable terminals of an error via a wireless communication in response to detection of an error as a cause of an interrupt of an image forming operation occurred in an image forming apparatus that forms an image on a sheet, the system comprising:
- a transmitter configured to transmit, via the wireless communication, a request message for requesting an operation to eliminate the error; and
- a controller configured to determine a first portable terminal, to which the request message is transmitted, among the plurality of portable terminals,
- wherein, when the error is detected by the detector, the controller controls the transmitter to:
  - transmit the request message to the first portable terminal, and
- wherein in a case where the transmitter fails to transmit the request message to the first portable terminal, the controller determines a portable terminal, to which the request message is transmitted, from among the plurality of portable terminals except the first portable terminal for which the transmission has failed.

* * * * *